US012561049B2

(12) United States Patent
Kogami

(10) Patent No.: US 12,561,049 B2
(45) Date of Patent: Feb. 24, 2026

(54) INFORMATION PROCESSING SYSTEM, INFORMATION PROCESSING APPARATUS, AND INFORMATION PROCESSING METHOD

(71) Applicant: Kazuhiko Kogami, Kanagawa (JP)

(72) Inventor: Kazuhiko Kogami, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 168 days.

(21) Appl. No.: 18/420,829

(22) Filed: Jan. 24, 2024

(65) Prior Publication Data

US 2024/0289001 A1      Aug. 29, 2024

(30) Foreign Application Priority Data

Feb. 28, 2023      (JP) ................................. 2023-029754

(51) Int. Cl.
*G06F 3/04842*          (2022.01)
*G06F 3/0481*          (2022.01)
*G06F 3/16*          (2006.01)

(52) U.S. Cl.
CPC ........ *G06F 3/04842* (2013.01); *G06F 3/0481* (2013.01); *G06F 3/165* (2013.01)

(58) Field of Classification Search
CPC ..... G06F 3/04842; G06F 3/0481; G06F 3/165
See application file for complete search history.

(56) References Cited

U.S. PATENT DOCUMENTS

| | | | | |
|---|---|---|---|---|
| 9,202,469 | B1 * | 12/2015 | Moorjani | ................ G10L 25/78 |
| 11,128,483 | B1 * | 9/2021 | Surazski | ................ G06V 20/30 |
| 11,710,509 | B1 * | 7/2023 | Bhupati | ................ H04L 65/403 |
| | | | | 386/282 |
| 2021/0058585 | A1 * | 2/2021 | Hegde | ............. H04N 21/42204 |

OTHER PUBLICATIONS

Ke Miao et al., Integrated Parallel System for Audio Conferencing Voice Transcription and Speaker Identification, May 1, 2020, International Conference on High Performance Big Data and Intelligent Systems, pp. 1-8 (Year: 2020).*
Sunil John et al., Recording/ Archiving in IBM Lotus Sametime based Collaborative Environment, Oct. 1, 2009, International Multiconference on Computer Science and Information Technology, pp. 475-479 (Year: 2009).*

* cited by examiner

*Primary Examiner* — Tam T Tran
(74) *Attorney, Agent, or Firm* — XSENSUS LLP

(57) ABSTRACT
An information processing system includes circuitry that acquires audio of a participant and other participants in communication with each other. The circuitry also receives a predetermined operation by the participant during the communication, records time information indicating the time when the predetermined operation is received, and provides a display screen to display an index indicating an audio status of the participant and the other participants based on the audio, and a location where the predetermined operation is received in the communication based on the time information.

18 Claims, 19 Drawing Sheets

RECORD 311

320

RECORDING

00:18:05

STOP 321

MARK 322

330

RECORDING

00:18:05

STOP 331a

MARKING A 331b

MARKING B

...

START
↓
RECEIVES OPERATION
TO START RECORDING                     S1101
↓
START AUDIO
TRANSMITTING PROCESS                   S1102
↓
RECEIVE MARKING
OPERATION?                             S1103      NO
↓ YES
NOTIFY THAT MARKING
OPERATION HAS BEEN RECEIVED            S1104
↓
RECEIVE OPERATION
TO RECORDING?                          S1105   NO
↓ YES
STOP AUDIO
TRANSMITTING PROCESS                   S1106
↓
END

INFORMATION PROCESSING SYSTEM, INFORMATION PROCESSING APPARATUS, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2023-029754, filed on Feb. 28, 2023, in the Japan Patent Office, the entire disclosure of which is hereby incorporated by reference herein.

BACKGROUND

Technical Field

The present disclosure relates to an information processing system, an information processing apparatus, and an information processing method.

Background Art

Meeting systems that transmit and receive content data, such as video or audio, between multiple terminals are becoming popular. Furthermore, in recording and replay devices, there is a known technology for sharing scenes that one viewer wants to watch with another viewer by communicating bookmarks created by the one viewer to the other viewer.

SUMMARY

Embodiments of the present disclosure describe an information processing system, an information processing apparatus, and an information processing method.

According to one embodiment, the information processing system includes circuitry configured to acquire audio of a participant and other participants in communication with each other, receive a predetermined operation by the participant during the communication, record time information indicating the time when the predetermined operation is received, provide a display screen displaying an index indicating an audio status of the participant and the other participants based on the audio, and a location where the predetermined operation is received during the communication based on the time information.

According to another embodiment, an information processing method comprises acquiring audio of a participant and other participants in communication with each other, receiving a predetermined operation by the participant during the communication, recording time information indicating the time when the predetermined operation is received, providing a display screen displaying an index indicating an audio status of the participant and the other participants based on the audio, and a location where the predetermined operation is received during the communication based on the time information.

According to yet another embodiment, a non-transitory computer readable medium storing computer executable instructions which, when executed by circuitry of an information processing system, cause the information processing system to perform a process comprising acquiring audio of a participant and other participants in communication with each other, receiving a predetermined operation by the participant during the communication, recording time information indicating the time when the predetermined operation is received, providing a display screen displaying an index indicating an audio status of the participant and the other participants based on the audio, and a location where the predetermined operation is received in the communication based on the time information.

BRIEF DESCRIPTION OF THE DRAWINGS

A more complete appreciation of exemplary embodiments of the present disclosure and many of the attendant advantages and features thereof can be readily obtained and understood from the following detailed description with reference to the accompanying drawings, wherein:

FIG. 3A is a diagram illustrating an example of an operation screen of a terminal according to exemplary embodiments of the present disclosure.

FIG. 3B is a diagram illustrating another example of an operation screen of a terminal according to exemplary embodiments of the present disclosure.

FIG. 3C is a diagram illustrating a further example of an operation screen of a terminal according to exemplary embodiments of the present disclosure.

Figure 1:
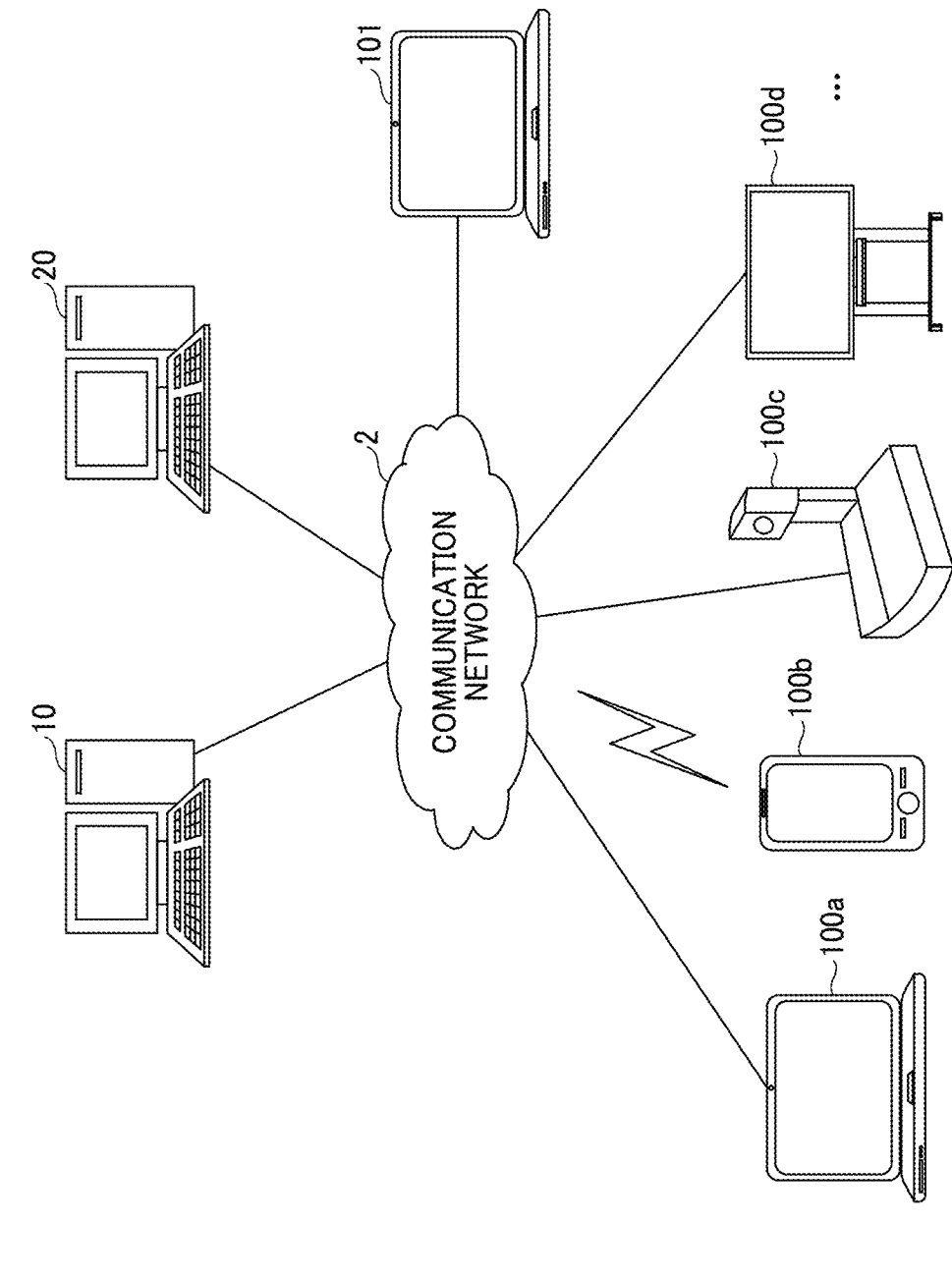
FIG. 1 is a diagram illustrating an example of a system configuration of an information processing system according to exemplary embodiments of the present disclosure.

As one of ordinary skill will recognize, the accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

Figure 2:
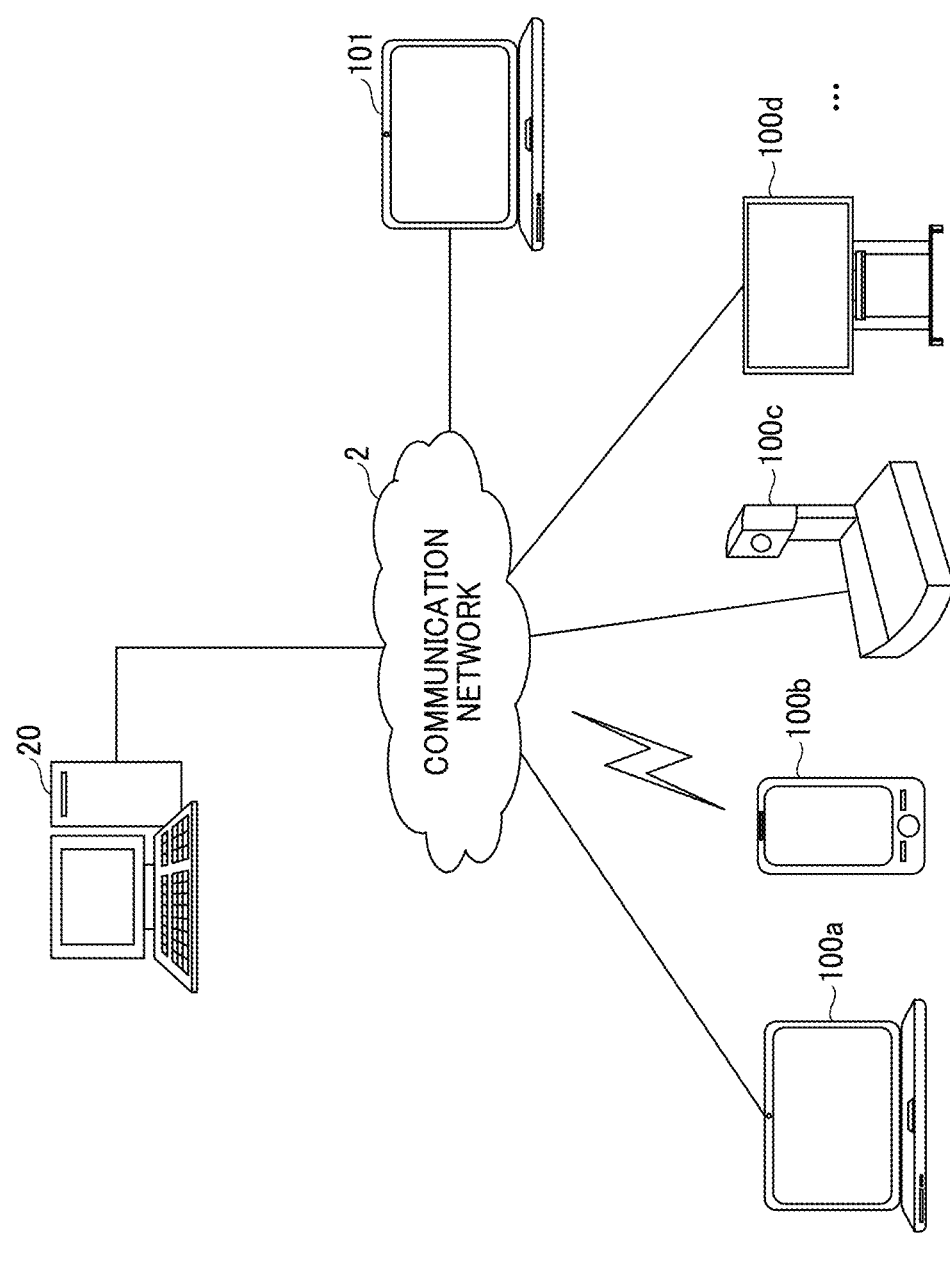
FIG. 2 is a diagram illustrating another example of the system configuration of the information processing system according to exemplary embodiments of the present disclosure.

FIGS. 1 and 2 are diagrams illustrating an example of a system configuration of an information processing system according to embodiments of the present disclosure. The information processing system 1, for example, includes a meeting server 10, an information processing apparatus 20, a plurality of terminal 100a, 100b, 100c, 100d, and an administrator terminal 101, etc., connected to a communication network 2 such as the Internet or a Local Area network (LAN) as shown in FIG. 1. In the following description, "terminal 100" is used to indicate any terminal among the plurality of terminal 100a, 100b, 100c, 100d. The number of multiple terminals 100 shown in FIG. 1 is an example.

The information processing system 1 is a system for supporting various types of communication between the terminal 100 and one or more other terminal 100 that send and receive at least voice business negotiations, meetings, medical treatment, classes, or counseling. Of course, other voice communications are possible without departing from the scope of the present disclosure. Here, the "support" of communication supported by the information processing system 1 includes support for later confirmation of the content of the communication. As an example, the following explanation assumes that the information processing system 1 supports checking of the contents of a web meeting after the web meeting is held, in which a user of terminal 100 and a user of another terminal 100 send and receive video including audio to conduct a conversation.

The terminal 100 is a general-purpose information terminal, such as a Personal Computer (PC), tablet terminal, or smartphone, that is used by users participating in a web meeting. Alternatively, the terminal 100 may be an electronic device with web meeting function, such as a video meeting device or an Interactive White Board (IWB). The IWB is a white board with electronic blackboard functions that can communicate with other devices including other IWBs, and the IWB is also called an electronic blackboard. As an example, the following description assumes that the terminal 100 is a general-purpose information terminal.

The Participant in a web meeting participates by accessing the meeting address provided by the meeting server 10 using a web meeting application or a web browser installed on the terminal 100.

The meeting server 10 is an information processing apparatus having a computer configuration, or a system including multiple computers. The meeting server 10 provides a web meeting service that transmits and receives audio or video including audio between multiple terminal 100. The web meeting service provided by the meeting server 10 may be any web meeting service.

The information processing apparatus 20 may have a computer configuration or may be a system including a plurality of computers. The information processing apparatus 20 provides the communication support service of this embodiment.

Administrator terminal 101 is an information terminal, such as the PC, tablet terminal, or smartphone, used by an administrator who uses the communication support service of this embodiment. The administrator uses the communication support service by using the web browser in the administrator terminal 101 or an application program (hereinafter referred to as "application") for the information processing system 1 executed by the administrator terminal 101.

In addition, the participant in the web meeting can use the communication support service in the same way as administrators, using the terminal 100 used by the participant or the administrator terminal 101.

The system configuration of the information processing system 1 shown in FIG. 1 is an example. For example, the information processing system 1 may not have a meeting server 10 as shown in FIG. 2. In this case, the terminal 100 may perform the web meeting using a web meeting service external to the information processing system 1. Alternatively, the information processing apparatus 20 may have the function of the meeting server 10, and the terminal 100 may perform web meeting using the web meeting service provided by the information processing apparatus 20.

(Process Overview)

For example, when a meeting is performed using the web meeting service provided by the meeting server 10, the person in charge of the meeting or another person, such as a manager of the person may need to check the content of the meeting later after the meeting is held. However, it can be difficult for a person to check the content of the meeting recorded in the information processing system 1 after the meeting is held.

For example, if the time required for a meeting is one hour, even if the audio could be replayed at double speed, it can take 30 minutes to replay all of the audio. Therefore, it is difficult for a manager who manages multiple people to grasp all of the details of meetings by replaying the audio of the meetings performed by multiple people. The same problem exists when a person who participated in a meeting checks the contents of the meeting by replaying the audio of the meeting.

Therefore, the information processing system 1 of this exemplary embodiment provides a communication support service that facilitates the checking of contents of a web meeting at a later time after the web meeting is held. For example, by executing an application corresponding to the information processing system 1, the terminal 100 displays an operation screen 310 as shown in FIG. 3A on a display of the terminal 100.

Figures 3A, 3B, 3C:
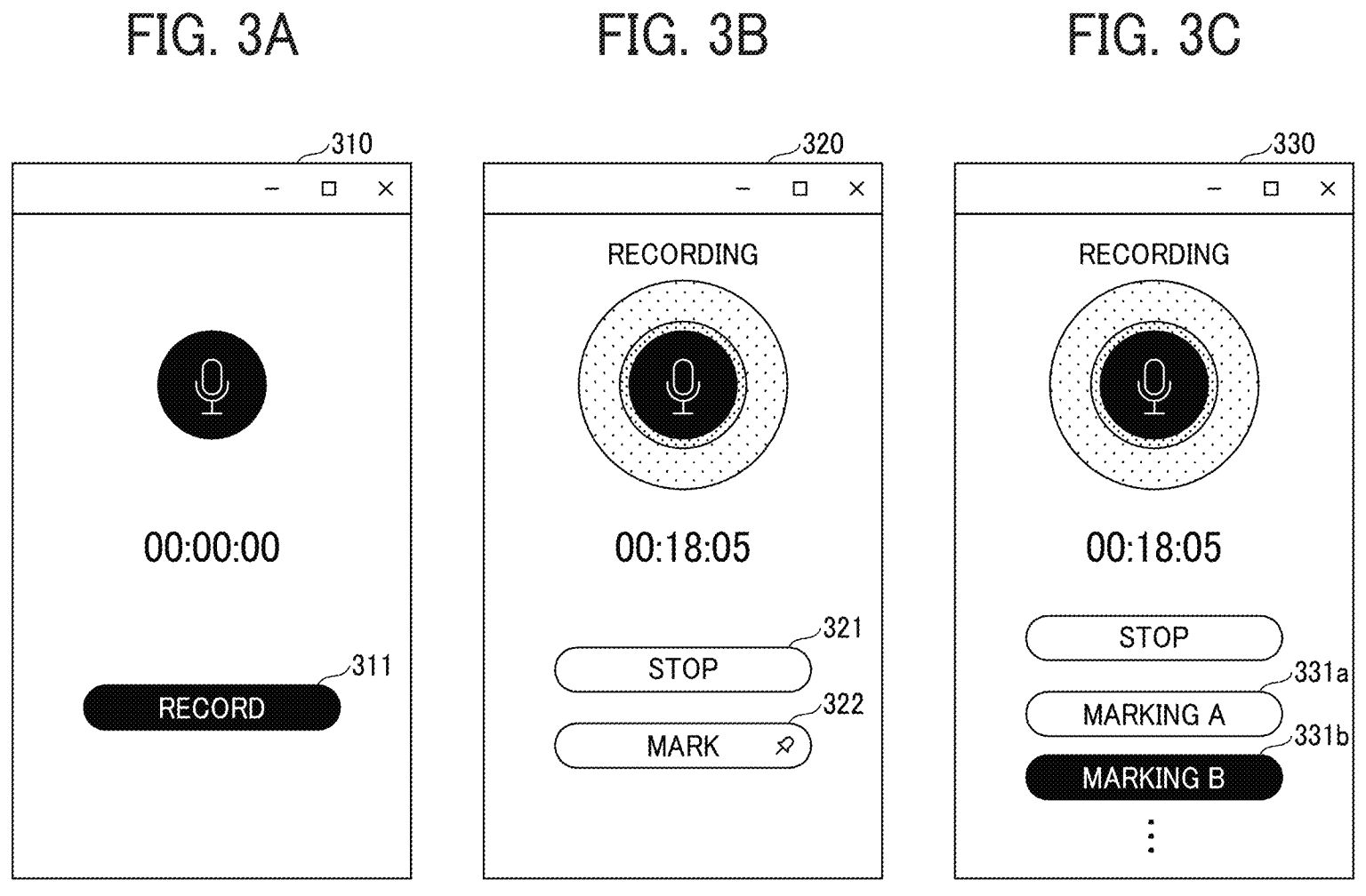

In the operation screen 310 shown in FIG. 3A, when the participant in the web meeting selects the "Record" button 311, the information processing system 1 starts recording the audio of the participant in the web meeting and the audio of the other participants.

For example, the application executed by the terminal 100 acquires the audio of participant in the web meeting and the audio of other participants using voice circuits provided by the terminal 100, and transmits the acquired audio to the information processing apparatus 20. The information processing apparatus 20 stores the audio of the participant in the web meeting and the audio of other participants received from the terminal 100.

The application executed by the terminal 100 displays the operation screen 320 shown in FIG. 3B on the display of the terminal 100 while the audio is being recorded. In the operation screen 320 shown in FIG. 3B, when the participant in the web meeting selects the "Stop" button 321, the information processing system 1 stops recording the audio of the participant in the web meeting and the audio of the other participants. In addition, when the participant selects the "Mark" button 322, the participant can perform marking to add a marker to the audio being recorded.

For example, when the "Mark" button 322 is selected, the application executed by the terminal 100 notifies the information processing apparatus 20 that the marking operation has been received. In response, the information processing apparatus 20 receives the marking operation by the participant and stores the time information indicating the time when the marking operation was received and the meeting ID identifying the meeting in a predetermined Database (DB).

As another example, the application executed by the terminal 100 may display the operation screen 330 as shown in FIG. 3C on the display of the terminal 100 while recording the audio. In the example of FIG. 3C, the operation screen 330 displays "marking A" button 331A, "marking B" button 331B, which add different markers to each other to the audio being recorded. This allows the participant to add different markers to the audio being recorded.

For example, when the "Marking A" button 331A is selected, the application executed by the terminal 100 notifies the information processing apparatus 20 of the selected marking (e.g., marking A). In response, the information processing apparatus receives the marking operation by the participant and stores the information on the selected marking, time information indicating the time when the marking operation was received, and the meeting ID in the DB. The "marking A" button 331A, "marking B" button 331B are examples of multiple display elements that receive different marking operations.

Figure 4:
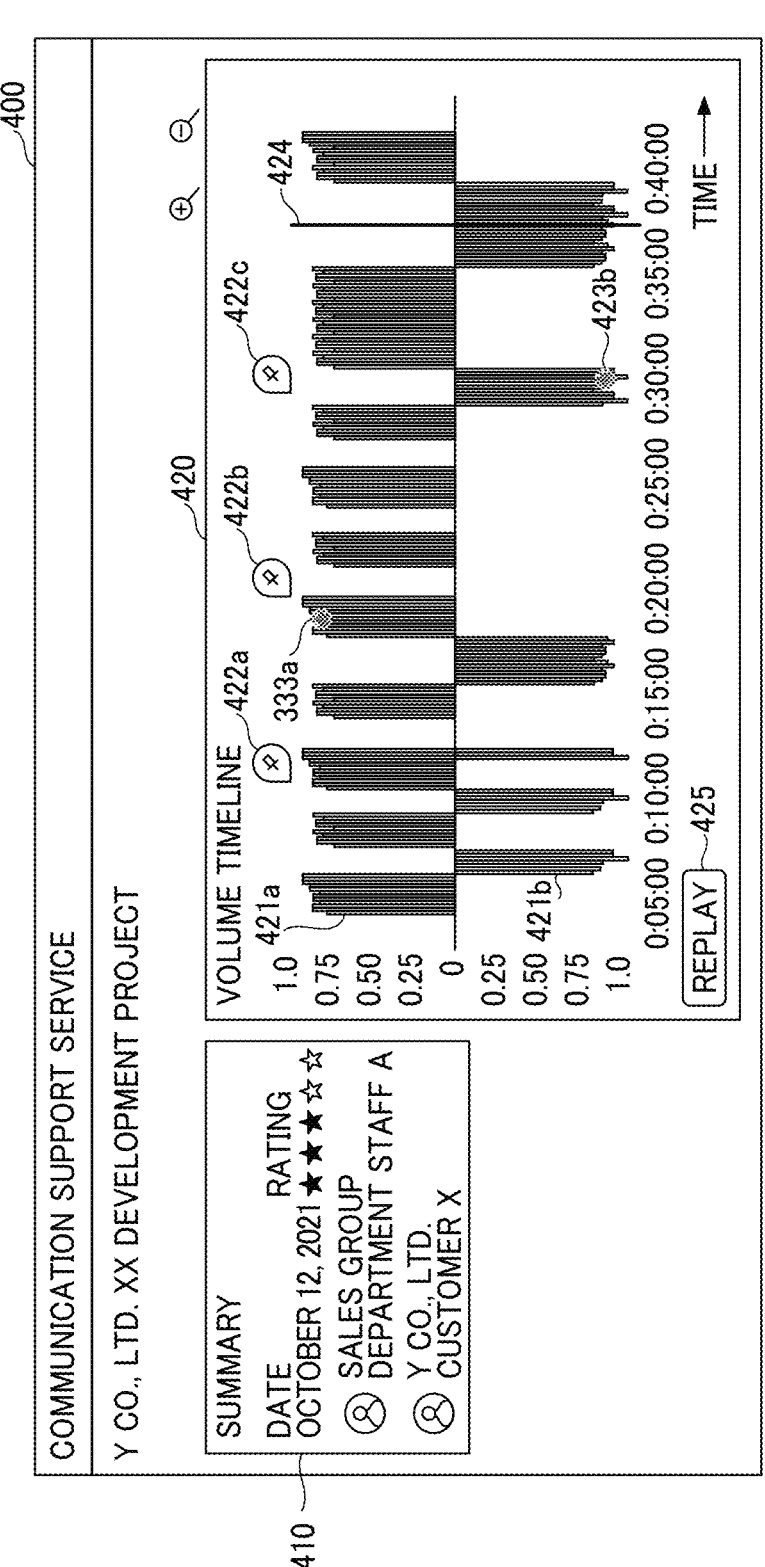
FIG. 4 is a diagram illustrating an example of a display screen according to exemplary embodiments of the present disclosure.

FIG. 4 is a diagram illustrating an example of a display screen according to embodiments of the present disclosure. FIG. 4 shows an example of a display screen 400 provided by the information processing system 1 to the administrator terminal 101 or terminal 100. In the example of FIG. 4, the display screen 400 provided by the information processing system 1 shows an overview 410 of the meeting and a volume timeline 420.

The summary 410 of the meeting displays the name of the participant (person in charge) who participated in the web meeting (hereinafter referred to as "meeting"), the names of other participants (for example, customers) who participated in the meeting, the date and time when the meeting started, and information such as a rating. Here, the rating is the result of the person who participated in the meeting self-evaluating the content of the business meeting using a number of stars.

The volume timeline 420 displays the audio volume 421A of the participant who participated in the meeting and the audio volume 421B of the other participants in the meeting in chronological order, with the horizontal axis being time. The audio volume 421A of the participant and the audio volume 421B of the other participants are examples of indexes that show the audio status of the participant and the other participants.

Preferably, the information processing system 1 calculates a moving average over a predetermined period of time (e.g., from a few seconds to a dozen minutes) from the audio volume data to be the audio volume 421A of the participant and the audio volume 421B of the other participant.

The information processing system 1 also displays markers 422A, 422B, 422C corresponding to the time when the marking operation was received on the volume timeline 420, based on the time information stored in the DB. This allows the administrator, or a participant, to easily identify the marked location from the volume time line 420. This makes it easier for the participant in the communication (e.g., meeting) or the administrator to check the content of the communication later.

Figure 5:
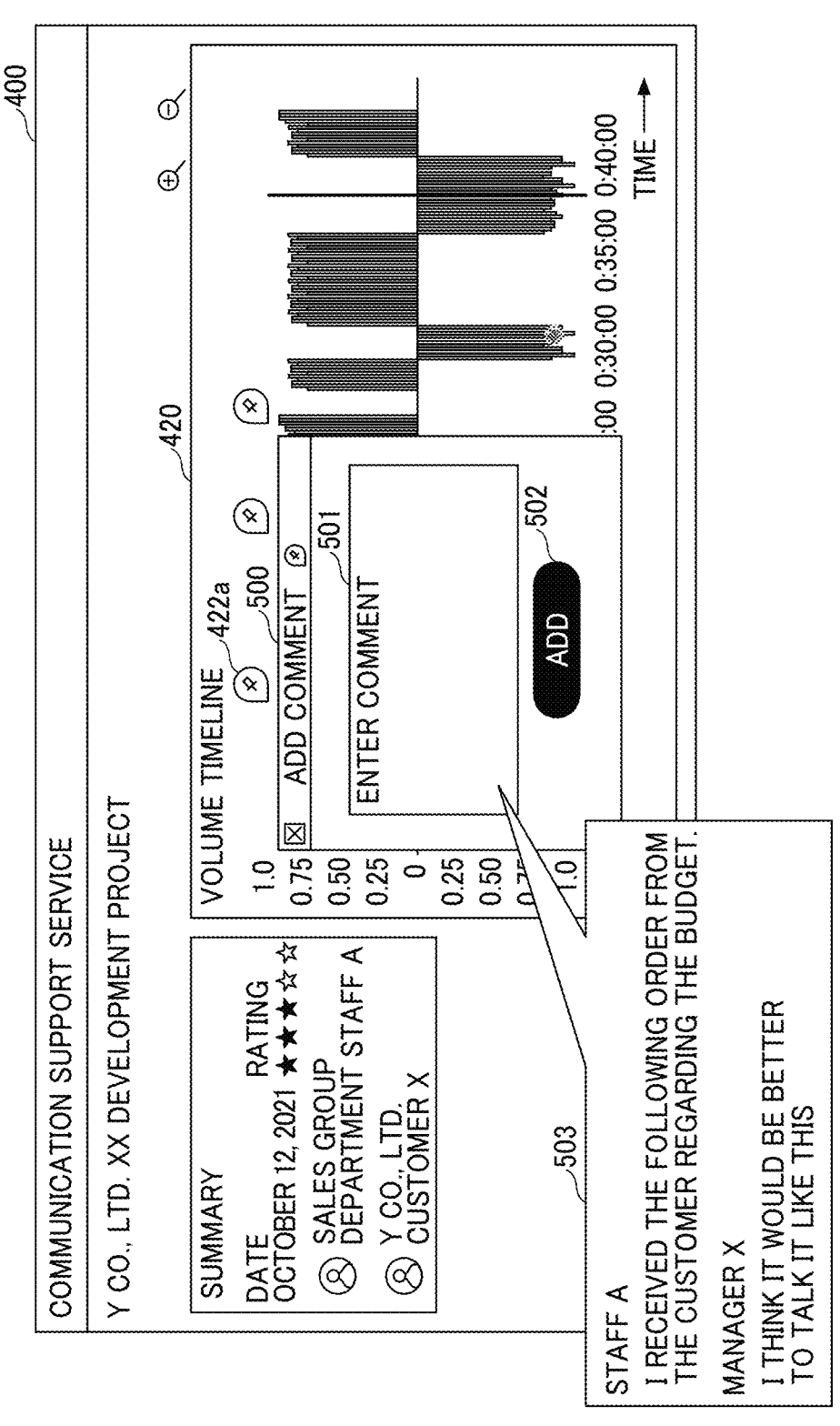
FIG. 5 is a diagram illustrating an example of a display screen according to exemplary embodiments of the present disclosure.

Preferably, the information processing system 1 displays a comment field 501 as shown in FIG. 5 on the display screen 400 when the marker 422A is selected on the display screen 400. In the example of FIG. 5, the information processing system 1 uses a pop-up window 500 to display the comment field 501. However, the method of displaying the comment field 501 is not limited to this, and other methods of displaying comment fields are possible without departing from the scope of the present disclosure.

The Participant and administrator can add comment to marker 422A by entering comment in comment field 501 and selecting "Add" button 502. For example, the administrator can use the administrator terminal 101 to display the display screen 400 as shown in FIG. 5 and add a comment 503 as shown in FIG. 5. Similarly, the participant (the person) can use the terminal 100 or the administrator terminal 101 to display the display screen 400 as shown in FIG. 5, and add the comment 503 as shown in FIG. 5.

The comment 503 shown in FIG. 5 may be entered by the administrator or the participant, or the information processing system 1 may automatically display the user name of the logged-in user. By leaving the comment in this comment field 501, it becomes even easier for the participant or the administrator to check the content of the communication after the communication (meeting) is held.

The information processing system 1 may (or may not) display markers 423A and 423B at location where there may be a problem based on the audio volume 421A of the participant and the audio volume 421B of other participants displayed in chronological order. Here, the location where there may be the problems include location where the audio volume exceeds a predetermined threshold value (high or low audio volume).

Furthermore, the information processing system 1 has a function to replay the audio of a location selected from the audio volume 421A of the participant or the audio volume 421B of other participants displayed in chronological order on the display screen 400 as shown in FIG. 4. For example, it is assumed that the administrator or other person moves the bar 424, which indicates the replay location of the audio, to near the marker 422A and selects the "Replay" button 425. In this case, the information processing system 1 starts replaying the audio (the audio of participant or the audio of other participant) from the replay location indicated by the bar 424. With this replay function of the audio, the participant who participated in the communication or the administrator can easily check the audio at the location marked by the participant later.

Figure 6:
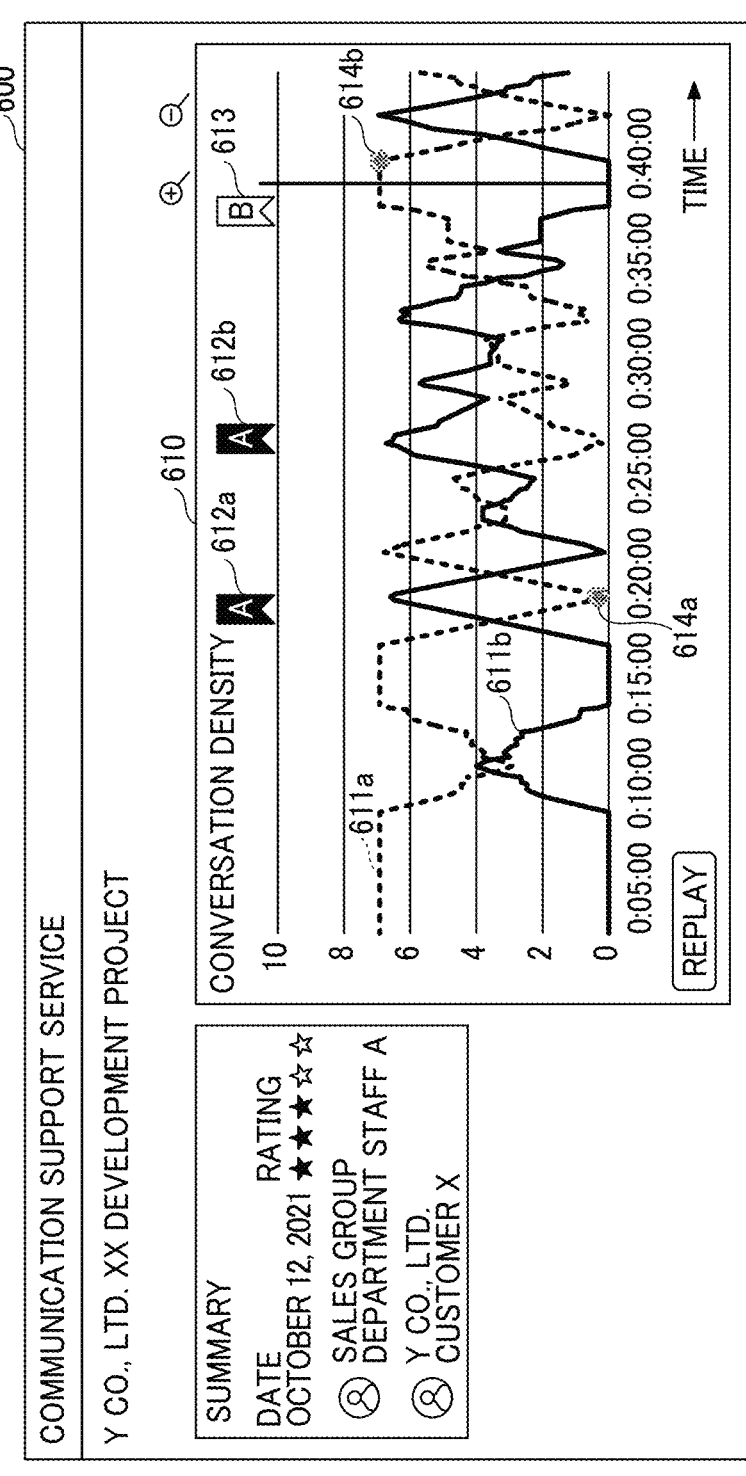
FIG. 6 is a diagram illustrating another example of a display screen according to exemplary embodiments of the present disclosure.

FIG. 6 is a diagram illustrating another example of a display screen according to exemplary embodiments of the present disclosure. In the example of FIG. 6, a display screen 600 provided by the information processing system 1 shows a conversation density 610 instead of the volume timeline

420 described in FIG. 4. The conversation density 610 is illustrated in chronological order, with the horizontal axis being time, and the conversation density 611A of the participant (the person) and the conversation density 611B of the other participants (customers). Here, the conversation density is expressed in terms of the number of characters (or words) uttered within a given time period. The conversation density 610 is another example of an index of the audio status of the participant and other participants.

Preferably, the information processing system 1 calculates a moving average over a predetermined period of time (e.g., from a few seconds to a dozen minutes) from the calculated conversation density data to determine the conversation density 611A of the participant and the conversation density 611B of the other participants.

In the example of FIG. 6, the information processing system 1 sets the display of the conversation density 611B selected by the administrator as active, and the display of conversation density 611A as inactive, among the conversation density 611A of the participant and the conversation density 611B of the other participants.

The information processing system 1 displays the marker corresponding to the time when the marking operation was received in the conversation density 610, based on the time information stored in the DB and the information of the selected marking. At this time, the information processing system 1 displays different markers according to the information of the marking selected on the operation screen 330 as shown in FIG. 3C.

For example, the information processing system 20 displays markers A612A and markers A612B at the location where the "Marking A" button 331a is selected on the operation screen 330, and displays marker B613 at the location where the "Marking B" button 331b is selected.

This allows the participant to display different markers in the conversation density 610 depending on purposes. In the same manner, the participant may display different markers depending on the purposes in the volume timeline 420 of the display screen 400, as shown in FIG. 4.

The display screens 400 shown in FIG. 4 and FIG. 5 and the display screen 600 shown in FIG. 6 are examples of display screens provided by the information processing system 1. For example, the information processing system 1 may provide a display screen that simultaneously displays the volume timeline 420 and the conversation density 610.

As described above, according to the present embodiment, it is possible to provide the information processing system 1 that makes it easy for a participant who participated in communication or an administrator to check the content of the communication later.

<Hardware Configuration>
(Hardware Configuration of a Computer)

Figure 7:
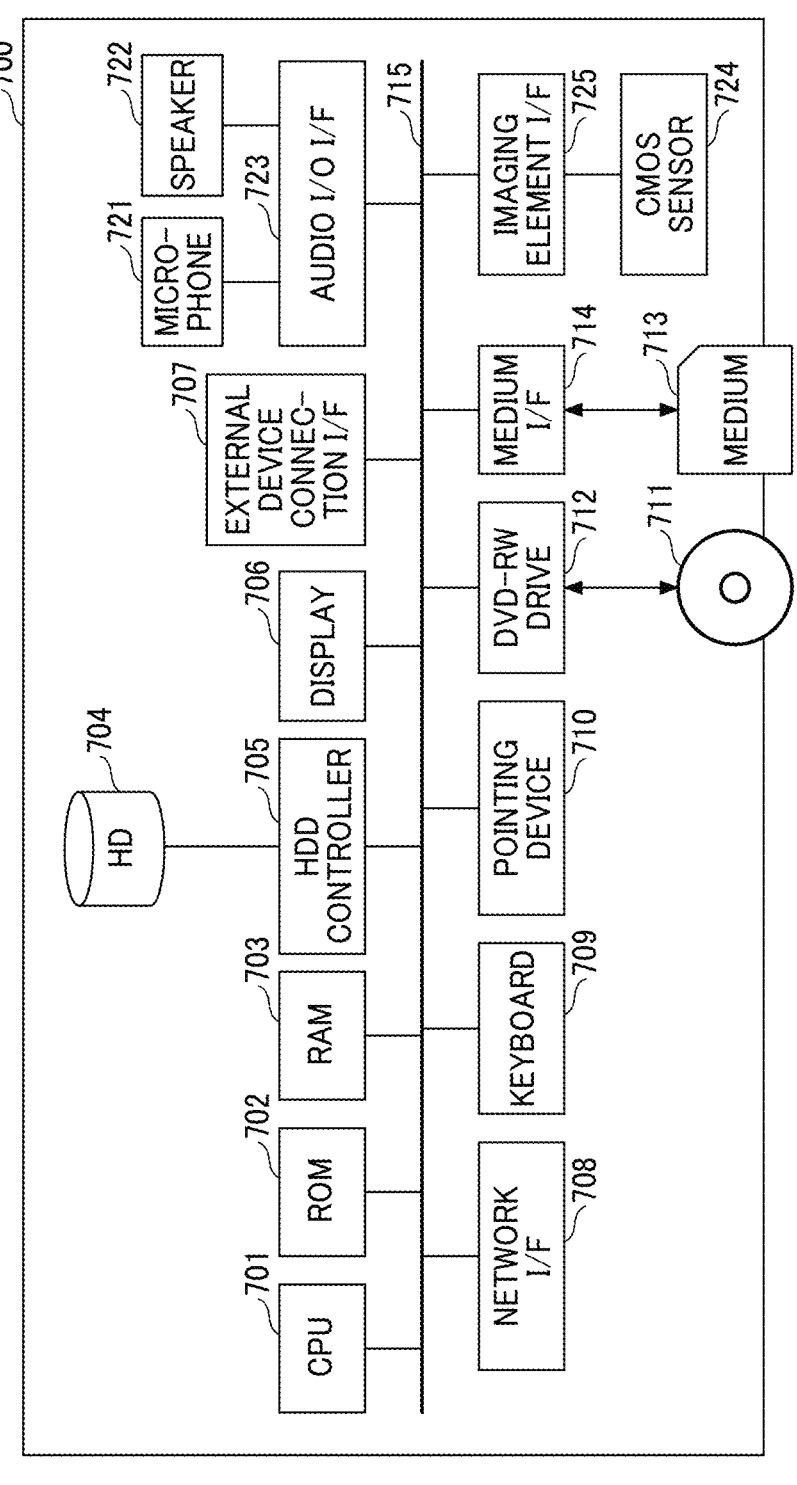
FIG. 7 is a diagram illustrating an example of the hardware configuration of a computer according to exemplary embodiments of the present disclosure.

The meeting server 10, the information processing apparatus 20, and the administrator terminal 101 have a hardware configuration of a computer 700 as shown in FIG. 7. The meeting server 10 and the information processing apparatus 20 may be realized by multiple computers 700. The terminal 100 may have a hardware configuration of a computer 700 as shown in FIG. 7, as an example.

FIG. 7 is a diagram illustrating an example of the hardware configuration of a computer according to exemplary embodiments of the present disclosure. As shown in FIG. 7, the computer 700 may include circuitry, such as a Central Processing Unit (CPU) 701, a Read Only Memory (ROM) 702, a Random Access Memory (RAM) 703, a Hard Disk (HD) 704, a Hard Disk Drive (HDD) controller 705, a display 706, an external device connection interface (I/F)

707, a network I/F 708, a keyboard 709, a pointing device 710, a Digital Versatile Disk Rewritable (DVD-RW) drive 712, a medium 713, a medium interface 714, and a bus lines 715.

When the computer 700 is the terminal 100, the computer 700 may further include a microphone 721, a speaker 722, an audio input/output (I/O) I/F 723, a Complementary Metal Oxide Semiconductor (CMOS) sensor 724, and an imaging element I/F 725.

The CPU 701 controls the operation of the entire computer 700. In an exemplary implementation, CPU 701 may include or be encompassed by circuits, processing circuits or processing circuitry, which will be discussed later. The ROM 702 stores a program such as an Initial Program Loader (IPL) to boot the computer 700. The RAM 703 is used as a work area for the CPU 701. The HD 704 stores various data and programs such as operating systems (OS), applications, device drivers. The HDD controller 705 controls reading and writing of various data to the HD 704 under the control of CPU 701. The HD 704 and the HDD controller 705 are examples of storage devices provided by the computer 700.

The Display 706 displays various information such as cursors, menus, windows, characters, or images. The display 706 may be provided outside the computer 700. The external device connection I/F 707 is an interface for connecting the computer 700 to various external devices. The network I/F 708 is an interface for connecting the computer 700 to the communication network 2 to communicate with other devices.

The keyboard 709 is an example of an input device provided with a plurality of keys for inputting characters, numerical values, and various instructions. The pointing device 710 is an example of an input device for selecting and executing various instructions, selecting a processing target, and moving the cursor. The keyboard 709 and the pointing device 710 may be provided outside the computer 700.

The DVD-RW drive 712 controls the reading or writing of various data to the DVD-RW 711, which is an example of a removable recording medium. The DVD-RW 711 is not limited to DVD-RW, but may be any other recording medium. Medium I/F 714 controls reading or writing (storage) of data to medium 713 such as flash memory or any other desired type of memory. Bus line 715 includes address buses, data buses, and various control signals to electrically connect the above components.

The Microphone 721 is a built-in circuit that converts sound into electrical signals. The speaker 722 is a built-in circuit that converts electrical signals into physical vibrations to produce sounds such as music and voice. The audio I/O I/F 723 is a circuit that processes input/output of sound signals between the microphone 721 and the speaker 722 under the control of CPU 701.

The CMOS sensor 724 is a built-in image capturing device that captures a subject (such as a self-portrait or other picture) and obtains image data under the control of the CPU 701. The computer 700 may include an imaging device such as a Charge Coupled Device (CCD) sensor instead of the CMOS sensor 724. The imaging element I/F 725 is a circuit that controls the drive of the CMOS sensor 724.

Of course, one of ordinary skill in the art will recognize that computer-readable instructions for causing a processor, such as the CPU 701, to perform the processes and functions described herein may be stored on non-transitory computer readable media, such as the above-mentioned ROM 702, RAM 703, DVD-RW 712, or any other media for storing such instructions as is known.

(Example of a Hardware Configuration of the Terminal)

Figure 8:
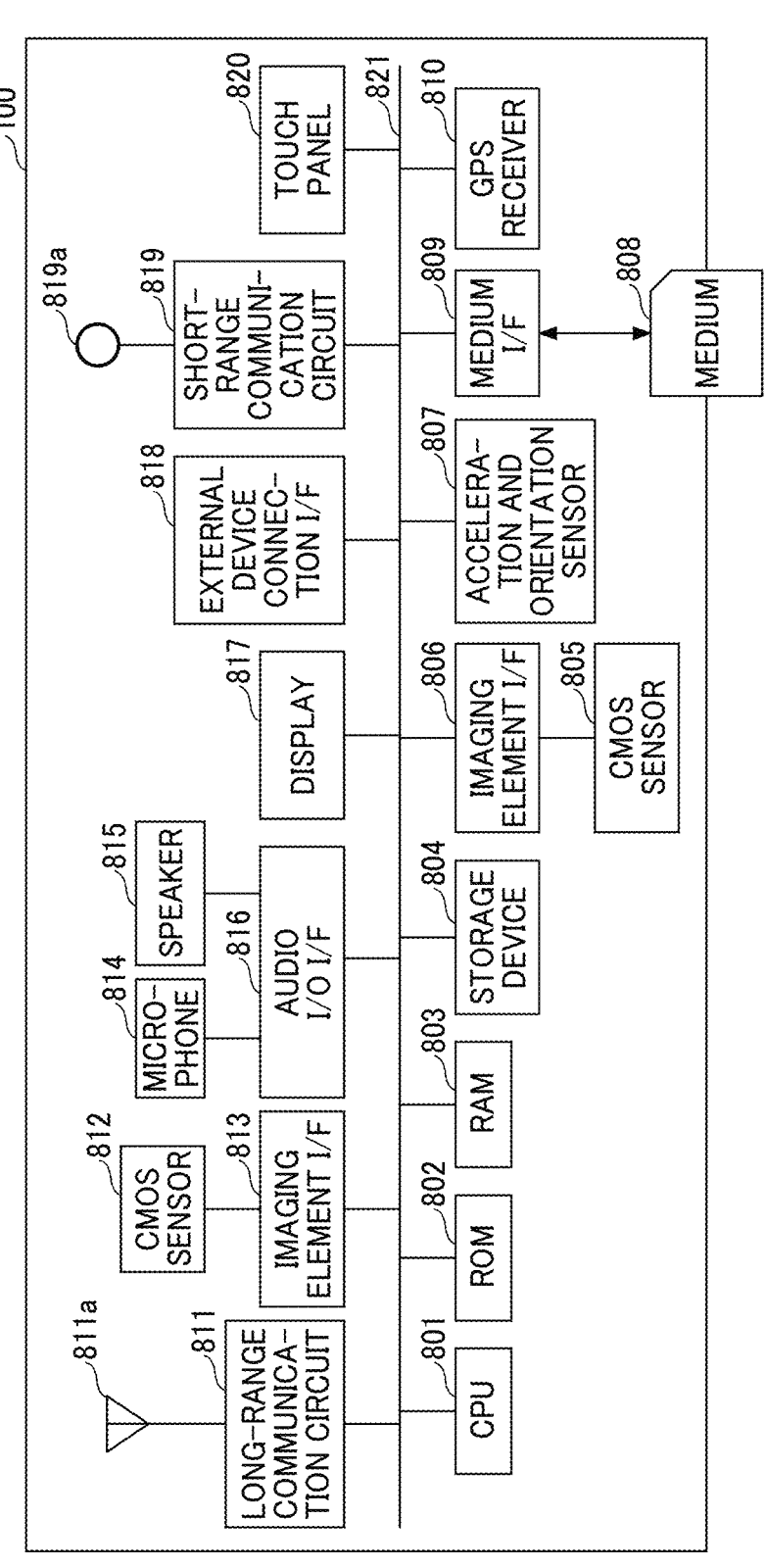
FIG. 8 is a diagram illustrating an example of the hardware configuration of a terminal according to exemplary embodiments of the present disclosure.

FIG. 8 is a diagram illustrating an example of the hardware configuration of a terminal according to exemplary embodiments of the present disclosure. Here, an example of the hardware configuration of the terminal 100 in a case where the terminal 100 is an information terminal such as a smartphone or a tablet terminal will be described. The terminal 100 may be an electronic device include a computer configuration and web meeting functions, such as a video meeting device or IWB. The administrator terminal 101 may have the hardware configuration of the terminal 100 as shown in FIG. 8.

In the example in FIG. 8, the terminal 100 may include circuitry, such as a CPU 801, a ROM 802, a RAM 803, a storage device 804, a CMOS sensor 805, an imaging element I/F 806, an acceleration and orientation sensor 807, a medium 808, a medium I/F 809, and a Global Positioning System (GPS) receiver 810.

The CPU 801 controls the operation of the entire terminal 100 by executing a predetermined program. In an exemplary implementation, CPU 801 may include or be encompassed by circuits, processing circuits or processing circuitry, which will be discussed later. The ROM 802 stores programs such as IPL used to boot the CPU 801. The RAM 803 is used as a work area for CPU 801. The storage device 804 is a large-capacity storage device that stores programs such as OS, applications, and various data, and is realized by SSD (Solid State Drive) or flash ROM.

The CMOS sensor 805 is a built-in image capturing device that captures a subject (such as a self-portrait or other picture) and obtains image data under the control of the CPU 801. The terminal 100 may include an imaging device such as a CCD sensor instead of the CMOS sensor 805. The imaging element I/F 806 is a circuit that controls the drive of the CMOS sensor 805. The acceleration and orientation sensor 807 includes one or more of a variety of sensors such as an electronic magnetic compass, gyrocompass, acceleration sensor, or various other sensors that detect geomagnetism. The Medium I/F 809 controls reading or writing (storage) of data to medium (storage media) 808 such as flash memory or any other desired type of memory. The GPS receiver 810 receives GPS signals (positioning signals) from GPS satellites.

The terminal 100 also includes a long-distance communication circuit 811, an antenna 811A of the long-distance communication circuit 811, a CMOS sensor 812, an imaging element I/F 813, a microphone 814, a speaker 815, an audio I/O I/F 816, a display 817, an external device connection I/F 818, a short-distance communication circuit 819, an antenna 819A for the short-distance communication circuit 819, and a touch panel 820.

Among these, the long-distance communication circuit 811 is a circuit that communicates with other devices via a communication network 2. The CMOS sensor 812 is a type of built-in image capturing device that captures a subject and obtains image data under the control of the CPU 801. The imaging element I/F 813 is a circuit that controls the drive of the CMOS sensor 812. The microphone 814 is a built-in circuit that converts sound into electrical signals. The speaker 815 is a built-in circuit that converts electrical signals into physical vibrations to produce sounds such as music and voice. The audio I/O I/F 816 is a circuit that processes the input/output of sound signals between the microphone 814 and the speaker 815 under the control of the CPU 801.

The display 817 is a type of display device such as liquid crystal or organic Electro Luminescence (EL) that displays an image of a subject, and various icons. The external device connection I/F 818 is an interface for connecting various external devices. The short-range communication circuit 819 includes a circuit for short-range wireless communication. The touch panel 820 is a kind of input device by which a user operates the terminal 100 by pressing the display 817.

The terminal 100 also includes the bus line 821. The bus line 821 includes address buses and data buses for electrically connecting each component such as the CPU 801 shown in FIG. 8.

The hardware configuration of the terminal 100 shown in FIG. 8 is an example. The terminal 100 may include various other hardware configurations as long as it include a computer configuration, communication circuitry, display, microphone, and speakers.

<Functional Configuration>

Figure 9:
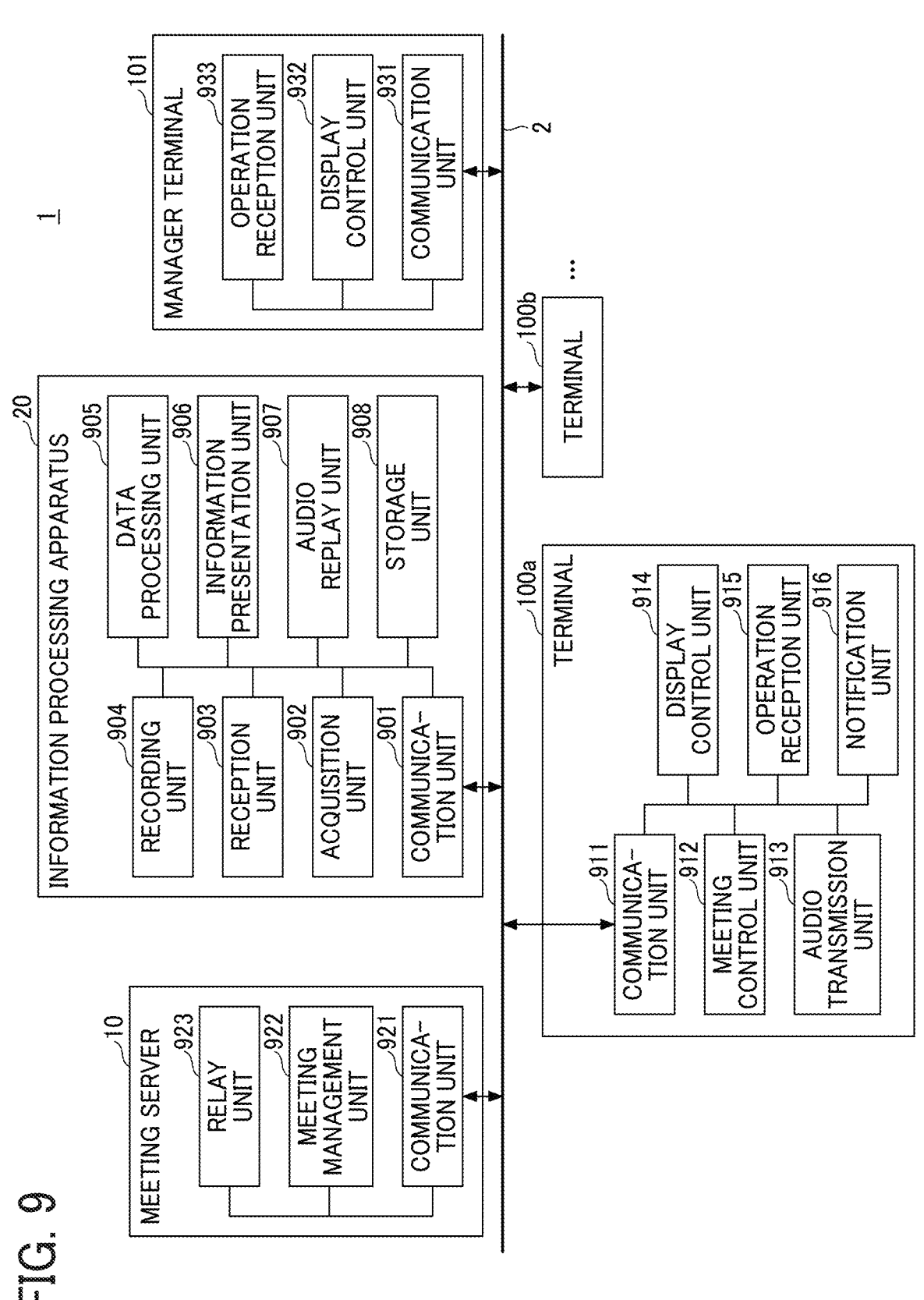
FIG. 9 is a diagram illustrating an example of a functional configuration of an information processing system according to exemplary embodiments of the present disclosure.

An example of the functional configuration of the information processing system 1 will be described. FIG. 9 is a diagram illustrating an example of a functional configuration of an information processing system according to embodiments of the present disclosure.

(Functional Configuration of the Terminal)

The terminal 10 realizes the functional configuration of the communication unit 911, meeting control unit 912, audio transmission unit 913, display control unit 914, operation reception unit 915, and notification unit 916 by the CPU 701 executing the predetermined program. At least some of the above functional configurations may be realized by hardware, such as circuitry. In this exemplary embodiment, the terminal 100B may have any functional configuration as long as it can participate in the same meeting as the terminal 100A via the meeting server 10.

The communication unit 911 connects the terminal 100 to the communication network 2 using the network I/F 708, and executes a communication process to communicate with the meeting server 10, the information processing apparatus 20, or other terminal 100, etc.

The meeting control unit 912 executes a series of processes related to a web meeting, such as connecting to a meeting, sending and receiving meeting video (or meeting audio), and inputting and outputting meeting video (or meeting audio). The processes executed by the meeting control unit 912 may be the same as those for a general web meeting. The meeting is an example of this type of communication.

The voice transmission unit 913 acquires the audio of a participant in a meeting (e.g., a user using the terminal 100A) and the audio of other participants in the meeting (e.g., a user using the terminal 100B), and executes a voice transmission process to transmit them to the information processing apparatus 20. For example, the voice transmission unit 913 acquires the audio, such as sounds acquired by a microphone from the sound input/output I/F 723, and transmits the acquired audio (voice data) to the information processing apparatus 20. This allows the information processing system 1 to support not only web meetings but also other meetings and other forms of communication.

However, the voice transmission unit 913 is not limited to this. The voice transmission unit 913 may also acquire the audio of the participant and the audio of other participants from the meeting control unit 912, and transmit the acquired audio (voice data) to the information processing apparatus 20.

The display control unit 914 executes a display control process to display a display screen on a display unit such as the display 706. The operation reception unit 915 executes an operation reception process to receive operations by participant using the keyboard 709 or the pointing device 710 or other input device. The meeting control unit 912, the display control unit 914, and the operation reception unit 915 may be realized by the web browser or the like provided by the terminal 100.

The notification unit 916 executes a notification process to notify the information processing apparatus 20 that a pre-determined operation is received when the operation screen displayed on the display unit by the display control unit 914 has received the predetermined operation. For example, when the "mark" button 322 is selected on the operation screen 320 as shown in FIG. 3B, the notification unit 916 notifies the information processing apparatus 20 of infor-mation indicating that the marking operation has been received.

(Functional Configuration of Information Processing Appa-ratus)

The information processing apparatus 20 realizes the functional configurations such as the communication unit 901, acquisition unit 902, reception unit 903, recording unit 904, data processing unit 905, information providing unit 906, and audio replay unit 907, by the one or more com-puters 700 executing predetermined programs. At least some of the above functional configurations may be realized by hardware, such as circuitry.

The information processing apparatus 20 also realizes the storage unit 908 by storage device such as the HD 704 and the HDD controller 705.

The communication unit 901 connects the information processing apparatus 20 to the communication network 2 using the network I/F 708, and executes a communication process to communicate with the terminal 100 or the admin-istrator terminal 101.

The acquisition unit 902 executes the acquisition process of acquiring the audio of the participant in a meeting (communication) and the audio of other participants in the same meeting. For example, the acquisition unit 902 acquires the voice of the participant and the voice of the other participants that is transmitted to the information processing apparatus 20 by the voice transmission unit 913 of the terminal 100 used by the participant.

The reception unit 903 executes a reception process to receive the predetermined operation by the participant in the meeting (communication). For example, the reception unit 903 receives the marking operation performed by the par-ticipant when it receives information indicating that the marking operation is received. The information indicating that the marking operation is received is transmitted upon receipt by the terminal 100. The marking operation is an example of the predetermined operation.

The recording unit 904 records the time information indicating the time when the predetermined operation was received and the meeting ID identifying the meeting in the DB, when the reception unit 903 receives the predetermined operation by the participant.

Figures 10, 11:
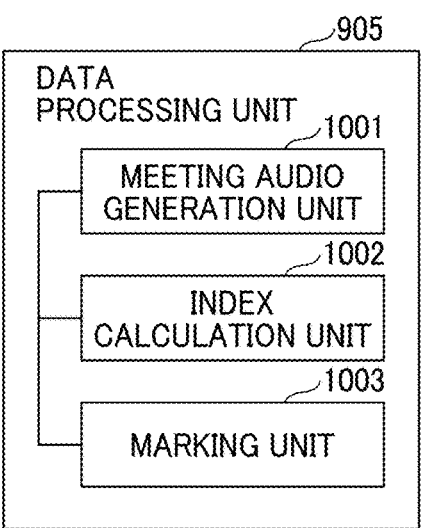
FIG. 10 is a diagram illustrating an example of a functional configuration of a data processing unit according to exemplary embodiments of the present disclosure.
FIG. 11 is a flowchart illustrating an example of a process of the terminal according to a first exemplary embodiment.

The data processing unit 905 executes data processing on the audio (voice data) of the participant and other partici-pants acquired by the acquisition unit 902. The data pro-cessing unit 905 includes a meeting audio generation unit 1001, an index calculation unit 1002, and a marking unit 1003, as shown in FIG. 10.

The meeting audio generation unit 1001 executes a meet-ing voice generation process that synthesizes the audio of the participant acquired by the acquisition unit 902 and the audio of other participants to generate a meeting audio that includes the audio of the participant and the audio of other participants.

The index calculation unit 1002 executes the index cal-culation process to calculate an index that indicate the audio status of the participant and other participants in the meet-ing, such as the volume timeline described in FIG. 4 or the conversation density described in FIG. 6.

For example, the index calculation unit 1002 calculates the audio volume of the participant and the audio volume of the other participants based on the audio of the participant and the other participants acquired by the acquisition unit 902. Preferably, the index calculation unit 1002 calculates the audio volume of the participant and the audio volume of the other participants for each predetermined period of time (e.g., a few seconds to a dozen minutes) by calculating a moving average of the audio volume of the participant and the audio volume of the other participants over a predeter-mined period of time.

Alternatively, the index calculation unit 1002 extracts the number of audio characters by performing speech recogni-tion on the audio of the participant and other participants acquired by the acquisition unit 902, and calculates the audio speed of the participant and the audio speed of the other participants. Based on the calculated audio speed data, the index calculation unit 1002 calculates the conversation density of the participant and the conversation density of other participants for each predetermined period of time (e.g., from a few seconds to a dozen minutes) by calculating a moving average over the predetermined period of time. Here, the conversation density is an index representing the number of characters (or words) uttered within a given period of time.

The marking unit 1003 executes a marking process to mark locations where the index indicating the audio status of a participant or the audio status of other participants calcu-lated by the index calculation unit 1002 satisfies a prede-termined condition. For example, the marking unit 1003 marks the locations where the audio volume of the partici-pant for each predetermined period or the audio volume of other participants for each predetermined period exceeds the first threshold value. Alternatively, the marking unit 1003 marks the locations where the conversation density of the participant for each predetermined period of time or the conversation density of the other participants for each pre-determined period of time exceeds the second threshold value.

Here, returning to FIG. 9, the description of the functional configuration of the information processing apparatus 20 will be continued. The information providing unit 906 provides the display screen that shows an index of the audio status of the participant and other participants based on the audio acquired by the acquisition unit 902, and provides the display screen that displays in an understandable manner the location where the predetermined operation was received based on the time information. Specifically, the information providing unit 906 provides the display screen that shows the index indicating the audio status of the participant and other participants in chronological order based on the audio acquired by the acquisition unit 902, and displays the marker corresponding to the time when the predetermined operation was received based on the time information stored in the DB. For example, the information providing unit 906 executes the information providing process to provide the display screen 400 described in FIG. 4 or the display screen 600 described in FIG. 6 to the administrator terminal 101 or the terminal 100, etc.

The audio replay unit 907 executes the audio replay process to replay the audio of the selected location from the index indicating the audio status of the participant and other participants illustrated on the display screen provided by the information providing unit 906. For example, the audio replay unit 907 acquires the time of the selected location from the index indicating the audio status of the participant and other participants, and replays the meeting audio generated by the meeting audio generation unit 1001 based on the acquired time.

The storage unit 908 stores the audio acquired by the acquisition unit 902, data such as the meeting audio generated by the data processing unit 905, and setting information such as threshold values.

(Functional Configuration of Meeting Server)

The meeting server 10 realizes functional configurations such as communication unit 921, meeting management unit 922, and relay unit 923, by one or more computers 700 executing predetermined programs. At least some of the above functional configurations may be realized by hardware, such as circuitry.

The communication unit 921 connects the meeting server 10 to the communication network 2 using the network I/F 708, and executes communication process to communicate with the terminal 100A, 100B, etc.

The meeting management unit 922 executes the meeting management process to allow multiple terminal 100 accessing the same web meeting Uniform Resource Locator (URL) to participate in the same meeting (session).

The relay unit 923 executes a relay process to relay content data including audio and image between multiple terminal 100 participating in the same meeting. The functions of the meeting management unit 922 and the relay unit 923 may be diverted from existing web meeting systems.

In this exemplary embodiment, the meeting server 10 may be any web meeting service external to the information processing system 1.

(Functional Configuration of Administrator Terminal)

The administrator terminal 101 has a communication unit 931, a display control unit 932, and an operation reception unit 933 realized by the computer 700 executing the predetermined program. At least some of the above functional configurations may be realized by hardware.

The communication unit 931 executes communication process to connect the administrator terminal 101 to the communication network 2 using the network I/F 708 to communicate with the information processing apparatus 20.

The display control unit 932 executes display control process to display the display screen provided by information providing unit 906 on the display unit such as display 706. The operation reception part 933 executes operation reception process to receive operations by the administrator on the display screen displayed by the display control part 932. The display control unit 932 and the operation reception unit 933 may be realized by the web browser provided by the administrator terminal 101. For example, the administrator terminal 101 may be a general-purpose information terminal with the web browser.

The functional configuration of the information processing system 1 shown in FIG. 9 is an example. For example, the functions of the meeting server 10 may be possessed by the information processing apparatus 20, the computer 700 outside the information processing system 1, or a cloud service. Also, at least a part of the functional configuration of the information processing apparatus 20 may be possessed by the terminal 100, or the administrator terminal 101. Furthermore, at least part of the functional configuration provided by the terminal 100 may be provided by the information processing apparatus 20, or the meeting server 10. In short, each of the functional configurations of the information processing system 1 shown in FIG. 9 may be possessed by any of the apparatus included in the information processing system 1.

The following is an example of the functional configuration of the information processing system 1.

<Processing Flow>

The following describes process flow of the information processing support method.

The First Embodiment (Process of the Terminal)

FIG. 11 is a flowchart illustrating an example of processing of the terminal according to the first exemplary embodiment. This process shows an example of a process executed by the terminal 100 (e.g., terminal 100A). It is assumed that at the start of the process shown in FIG. 11, the terminal 100 used by the participant (e.g., terminal 100A) is participating in the same meeting as the terminal used by the other participants (e.g., terminal 100B) and is at least capable of a voice meeting.

In step S1101, the operation reception unit 915 receives operation to start recording the meeting audio, and moves the process to step S1102. The participant can select the "record" button 311 on the operation screen 310 as shown in FIG. 3A for the operation to start recording the meeting audio.

In step S1102, the voice transmission unit 913 acquires the audio of the participant participating in the meeting and the audio of the other participants in the meeting, and starts the audio transmission process to transmit the acquired audio to the information processing apparatus 20.

In step S1103, the operation reception unit 915 determines whether the marking operation is received. For example, the participant can perform the marking operation by selecting the "mark" button 322 on the operation screen 320 as shown in FIG. 3B. In case that the marking operation is received, the operation reception unit 915 moves the process to step S1104. On the other hand, in case that the marking operation is not received, the operation reception unit 915 moves the process to step S1105.

In step S1104, the notification unit 916 notifies the information processing apparatus 20 via the communication unit 911 that the marking operation has been received.

Moving to step S1105, the operation reception unit 915 determines whether or not the operation to stop recording is received. The participant can perform the operation to stop recording by selecting the "stop" button 321 on the operation screen 320 as shown in FIG. 3B. In case that the operation to stop recording is not received, the operation reception unit 915 returns the process to step S1103. On the other hand, in case that the operation to stop recording is received, the operation reception unit 915 moves the process to step S1106.

Upon moving to step S1106, the audio transmission unit 913 stops or terminates the process of transmitting the audio.

The process shown in FIG. 11 allows the terminal 100 to transmit the audio of the participant and other participants to the information processing apparatus 20 and to notify the information processing apparatus 20 that the marking operation by the participant has been received.

(Data Process)

Figure 12:
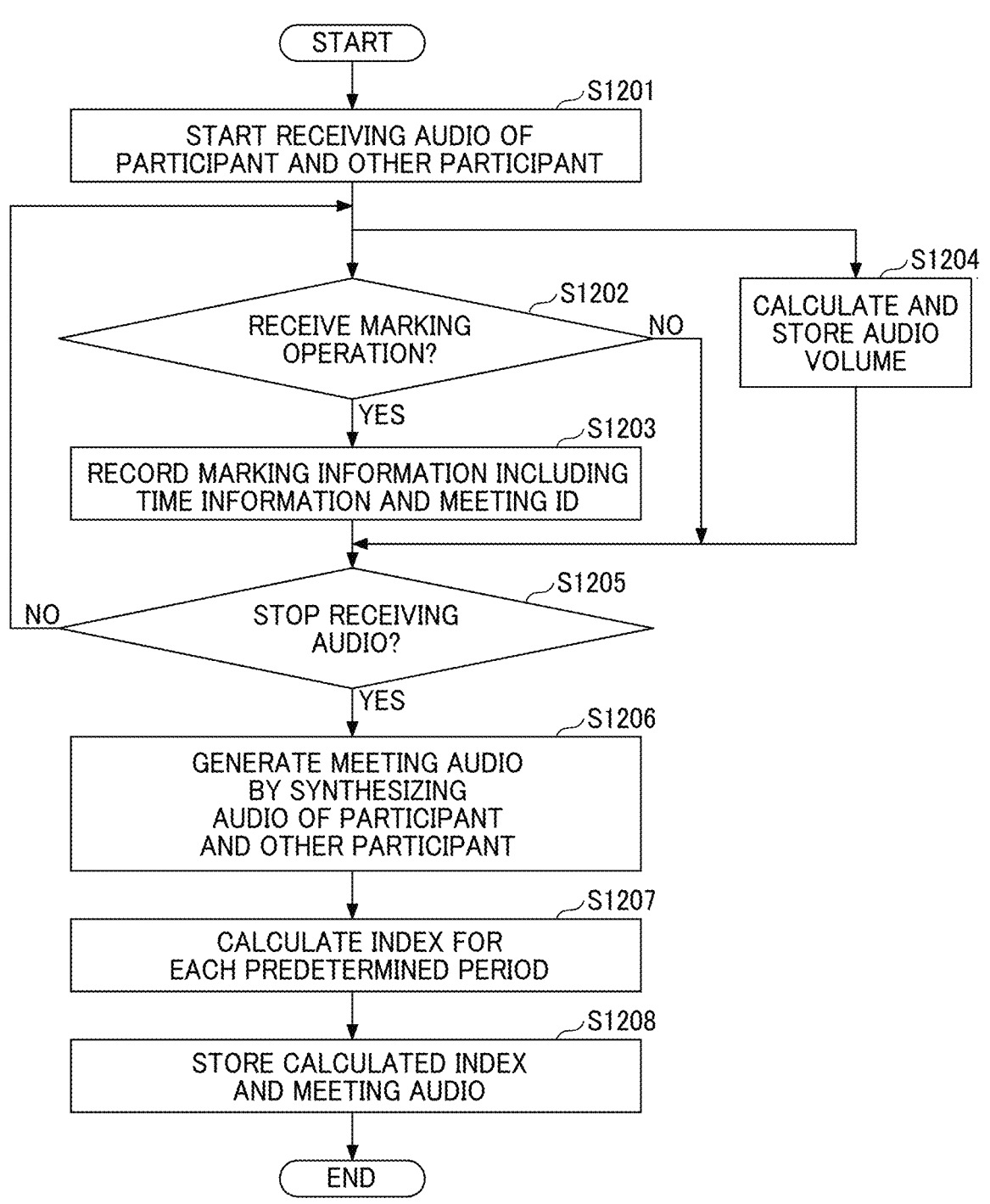
FIG. 12 is a flowchart illustrating an example of a data process according to the first exemplary embodiment.

FIG. 12 is a flowchart illustrating an example of data process according to the first exemplary embodiment. This process shows an example of the data process executed by the information processing apparatus 20 when it receives the audio of the participant and other participants transmitted by the terminal 100 to the information processing apparatus 20 through the terminal process described in FIG. 11.

In step S1201, when the acquisition unit 902 starts receiving the audio of the participant and other participants transmitted by the terminal 100, the process is moved to steps S1202 and S1204.

In step S1202, the reception unit 903 determines whether the marking operation is received. For example, the reception unit 903 determines that the marking operation is received when the reception unit 903 receives the notification transmitted by the terminal 100 indicating that the marking operation is received. In case that the marking operation is received, the reception unit 903 moves the process to step S1203. On the other hand, in case that the marking operation is not received, the reception unit 903 moves the process to step S1205. The marking operation is an example of a predetermined operation.

In step S1203, the recording unit 904 records marking information, which is information on selected marking, including the time information indicating the time when the marking operation was received by the reception unit 903 and the meeting ID identifying the meeting in the DB. Here, the meeting ID may be assigned by the recording unit 904 or may be notified by the terminal 100.

In step S1204, the data processing unit 905 calculates and stores the audio volume of the audio of the participant and other participants acquired by the acquisition unit 902 in parallel with the process of steps S1202 and S1203. For example, the data processing unit 905 attaches a time stamp to the calculated audio volume and stores it in the storage unit 908.

In step S1205, the acquisition unit 902 determines whether the reception of audio is stopped. In case that the reception of the audio is not stopped, the acquisition unit 902 returns the process to steps S1202 and S1204. On the other hand, in case that the reception of audio is stopped, the acquisition unit 902 moves the process to step S1206.

In step S1206, the data processing unit 905 synthesizes the audio of the participant and the audio of other participants acquired by the acquisition unit 902 to generate the meeting audio that includes the audio of the participant and the audio of other participants.

In step S1207, the data processing unit 905 calculates the index for each predetermined period. For example, at each point in the meeting, the data processing unit 905 calculates the audio volume of the participant for each predetermined period by calculating the moving average for the predetermined period from the audio volume data of the participant. Similarly, at each point in the meeting, data processing unit 905 calculates the audio volume of other participants for each predetermined period by calculating the moving average for the predetermined period from the audio volume data of the other participants. The audio volume of the participant for each predetermined period and the audio volume of the other participants are examples of index of the audio status of the participant and the other participants.

In step S1208, the data processing unit 905 stores the calculated index and the generated meeting audio in the storage unit 908. This data are an example of an index indicating the audio status of the person.

By processes in FIG. 12, the information processing apparatus 20 can acquire and store the audio of the participant and other participants in the meeting, the information on the time when the marking operation is received, and the index indicating the audio status of the participant and other participants.

(Process of Providing Display Screens)

Figure 13:
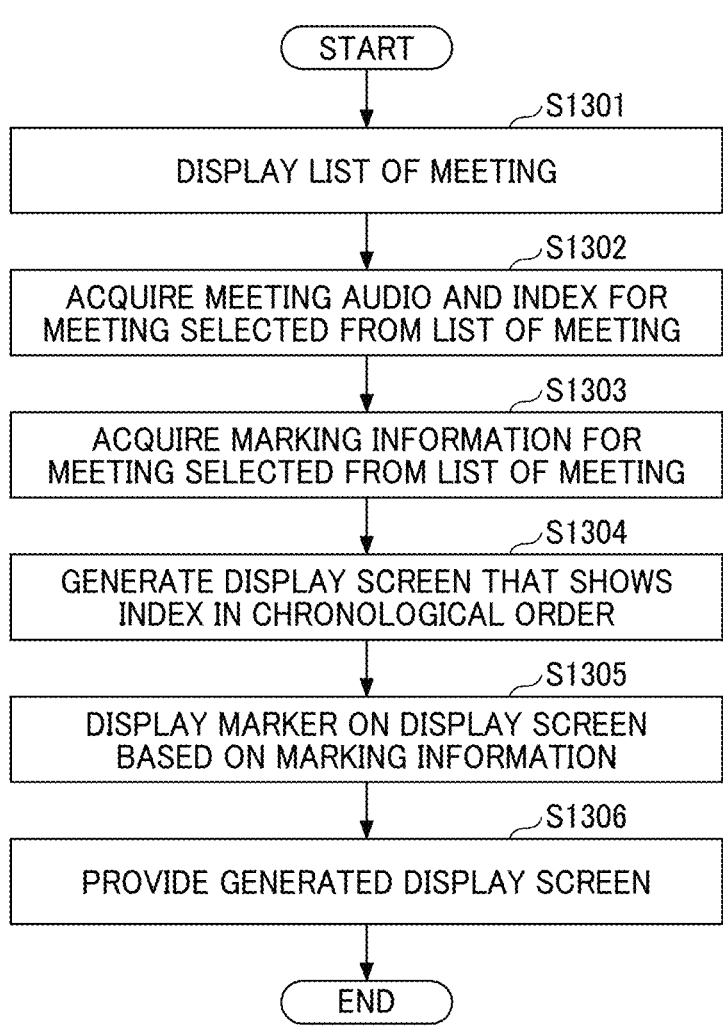
FIG. 13 is a flowchart illustrating an example of a display screen providing a process according to the first exemplary embodiment.

FIG. 13 is a flowchart illustrating an example of a display screen providing process according to the first exemplary embodiment. This process shows an example of the display screen providing process in which the information processing apparatus 20 provides the display screen 400 as shown in FIG. 4 or the display screen 600 as shown in FIG. 6 to the administrator terminal 101 or terminal 100. The following explanation assumes that the information processing apparatus 20 provides the display screen 400 to the administrator terminal 101.

In step S1301, the information providing unit 906 displays on the administrator terminal 101 a list of meetings whose data was stored in the data process described in FIG. 12. For example, the administrator can display the list of meetings by accessing a predetermined URL using the web browser provided by the administrator terminal 101.

In step S1302, the information providing unit 906 acquires from the storage unit 908, the meeting audio and the index indicating the audio status of the participant and other participants, corresponding to the meeting selected from the list of meetings. The processes in steps S1301 and S1302 are examples. For example, the information providing unit 906 may retrieve the meeting audio and the index from the storage unit 908 based on the meeting ID, entered by the administrator.

In step S1303, the information providing unit 906 acquires the marking information corresponding to the selected meeting from the DB. This marking information includes the meeting ID and the time information indicating the time when the marking operation is received.

In step S1304, the information providing unit 906 generates the display screen that shows the index of the audio status of the participant and other participants in chronological order based on the meeting audio, which is the audio of the participant and other participants. For example, the information providing unit 906 generates the display screen 400 that illustrates the volume timeline 420 as shown in FIG. 4. At this point, the volume timeline 420 does not display markers 422A, 422B, 422C, 423A, and 423B.

In step S1305, the information providing unit 906 draws on the display screen the marker corresponding to the time when the marking operation is received, based on the time information included in the acquired marking information. For example, the information providing unit 906 draws markers 422A, 422B, and 422C on the volume timeline 420 as shown in FIG. 4. At this point, markers 423A and 423B are not displayed on the volume timeline 420.

In step S1306, the information providing unit 906 provides the generated display screen to the administrator terminal 101.

By processes in FIG. 13, the information processing apparatus 20 can display the display screen 400 as shown in FIG. 4 on the administrator terminal 101. However, in the display screen provided by the information providing unit 906 in the first exemplary embodiment, the markers 423A and 423B are not displayed.

(Display Process for Comment Field)

Figure 14:
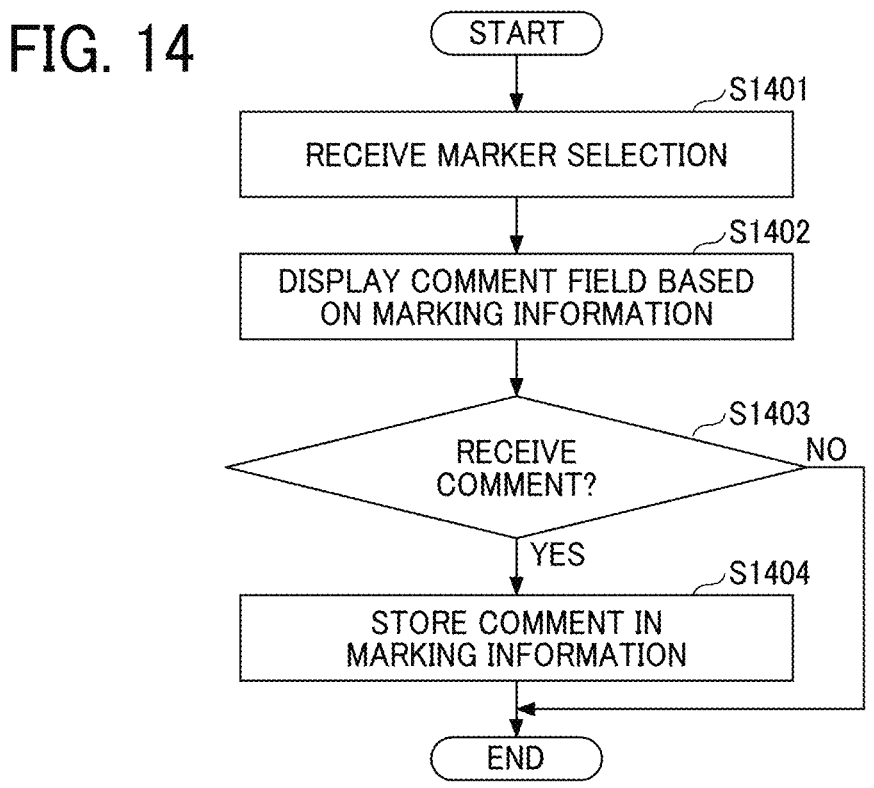
FIG. 14 is a flowchart illustrating an example of a comment field display process according to the first exemplary embodiment.

FIG. 14 is a flowchart illustrating an example of a comment field display process according to the first exemplary embodiment. This process shows an example of the comment field display process that displays the comment field 501 as shown in FIG. 5 on the display screen 400 as shown in FIG. 4.

In step S1401, the information providing unit 906 of the information processing apparatus 20 receives the selection of the marker and executes the process in step S1402 and thereafter. The administrator can select the marker 422A by clicking on the marker 422A, tapping on the marker 422A, or moving the cursor over the marker 422A on the display screen 40 as shown in FIG. 4. The information providing unit 906 determines that the selection operation of the marker 422A is received when it receives the notification from the administrator terminal 101 indicating that the selection operation of the marker 422A is received.

In step S1402, the information providing unit 906 displays the comment field based on the marking information of the selected marker. For example, the information providing unit 906 displays a comment field 501 as shown in FIG. 5, on the display screen 400 as shown in FIG. 4, which receives input corresponding to the selected marker.

In step S1403, the information providing unit 906 determines whether the comment is received in the displayed comment field. In case that the comment is received, the information providing unit 906 executes the process of step S1404. On the other hand, in a case that the comment is not received, the information providing unit 906 terminates the process of FIG. 14.

In step S1404, the information providing unit 906 stores in the marking information of the selected marker the comment received in the comment field.

By processes in FIG. 14, the information providing unit 906 stores in the marking information the comment received in the comment field, and the next time the comment field is displayed, the comments stored in the marking information can be displayed in the comment field.

(Meeting Audio Replay Process)

Figure 15:
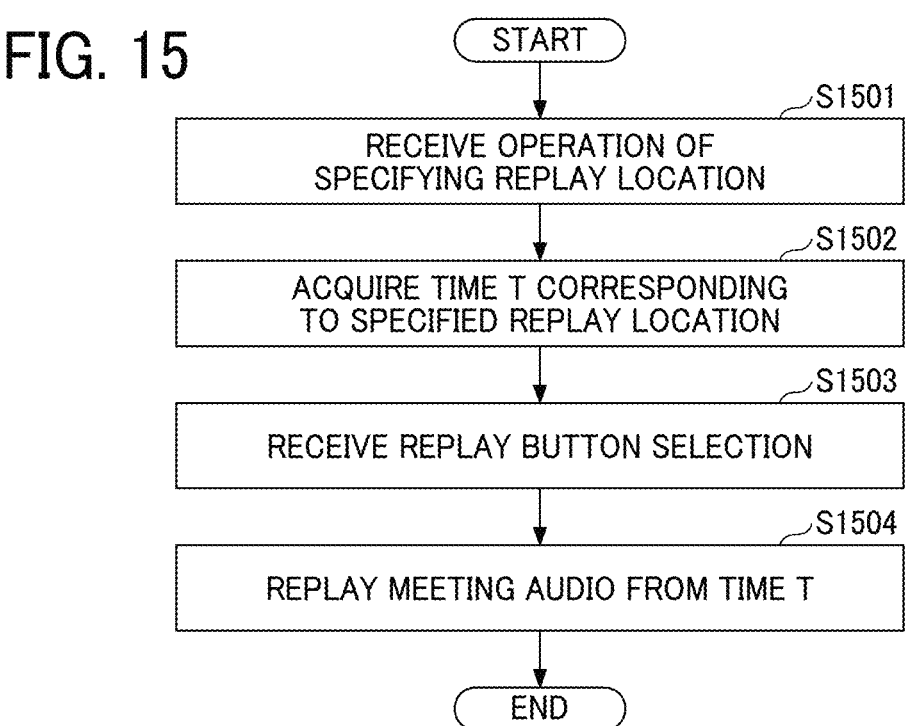
FIG. 15 is a diagram illustrating an example of a meeting audio replay process according to the first exemplary embodiment.

FIG. 15 is a diagram illustrating an example of a meeting audio replay process according to the first exemplary embodiment. This process shows an example of a meeting audio replay process that replays the meeting audio in the location selected by the administrator or others on the display screen 400 as shown in FIG. 4.

In step S1501, the information processing apparatus 20 receives the operation of specifying the replay location on the display screen 400 as shown in FIG. 4, and executes the process from step S1502 onward. The administrator can specify the replay location by moving the bar 424 indicating the replay location of the audio on the display screen 400.

In step S1502, the audio replay unit 907 acquires the time t corresponding to the replay location specified by the administrator.

In step S1503, when the audio replay unit 907 receives the selection of the replay button in step S1504, the audio replay unit 907 replays the meeting audio (the audio of the participant or the audio of other participants) from the acquired time t. For example, on the display screen 400 as shown in FIG. 4, when the administrator selects the "Replay" button 425, the audio replay unit 907 transmits the audio data of the meeting audio after time t to the administrator terminal 101. As a result, the administrator terminal 101 outputs the meeting audio after time t.

The meeting audio replay process shown in FIG. 15 is an example. For example, the audio replay unit 907 may omit the process of step S1503 and start replaying the meeting audio in step S1504 from the time t acquired in step S1502. The method of specifying the time t at which to start replaying the meeting audio may be by using a seek bar or the like.

Thus, according to the information processing system 1 of this embodiment, it is possible to easily replay the meeting audio of the location specified by the administrator in the index showing the audio status of the participant and other participants, which is displayed in chronological order on the display screen.

Second Embodiment

The second exemplary embodiment describes an example of a process in which the information processing apparatus 20 displays markers 423A and 423B in the locations of the volume timeline 420 where there may be problems on the display screen 400 as shown in FIG. 4.

(Data Process)

Figure 16:
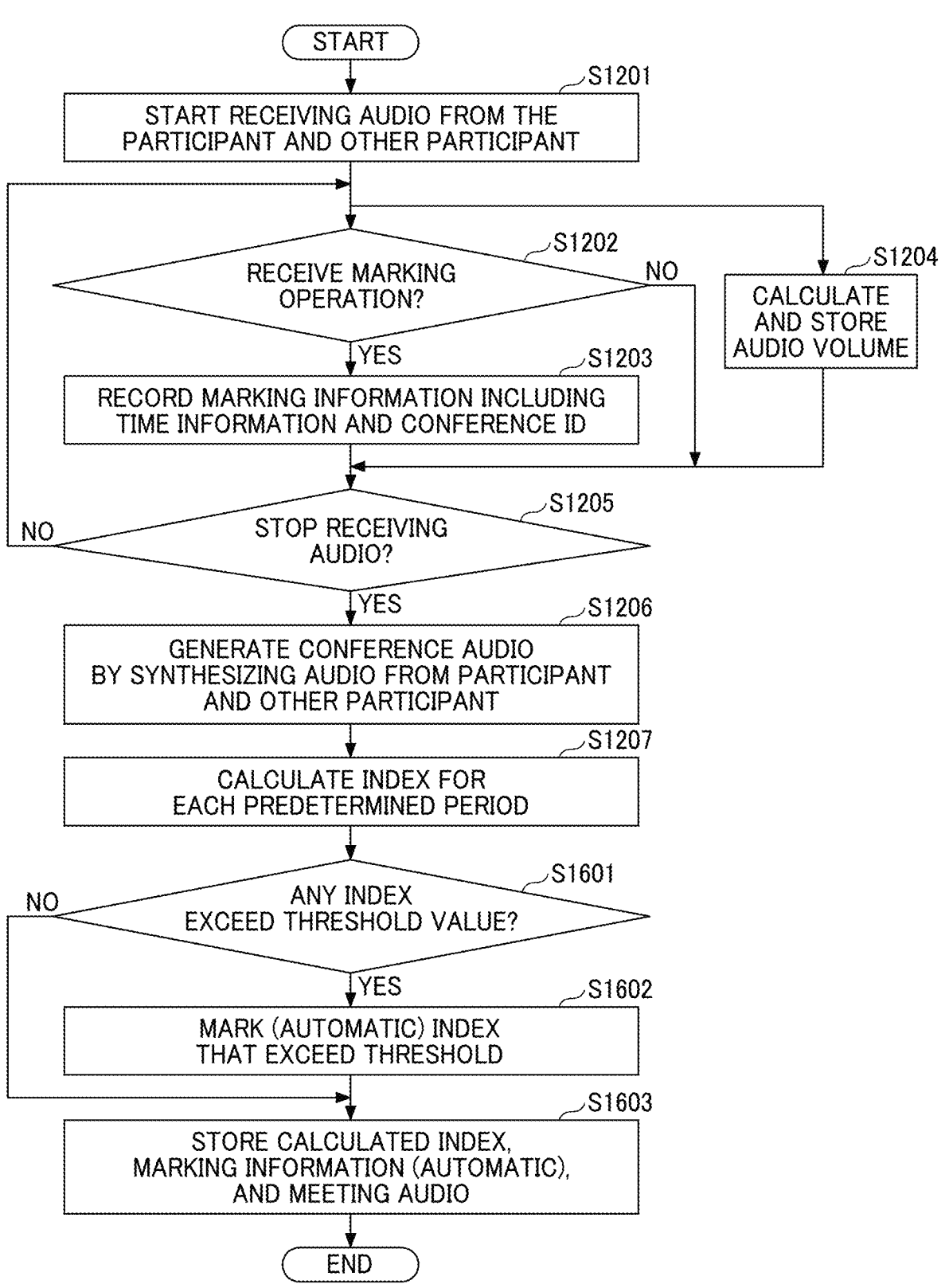
FIG. 16 is a flowchart illustrating an example of a data process according to a second exemplary embodiment.

FIG. 16 is a flowchart illustrating an example of data process according to the second embodiment. This process shows another example of a data process executed by the information processing apparatus 20 when it receives the audio of the participant and other participants sent by the terminal 100 to the information processing apparatus 20 through the terminal process described in FIG. 11.

Among the processes shown in FIG. 16, the processes of steps S1201 to S1207 are similar to the data process for the first exemplary embodiment described in FIG. 12.

In step S1207, the data processing unit 905 calculates the index for each predetermined period (the audio volume of the participant and the audio volume of other participants for each predetermined period), and then in step S1601, the data processing unit 905 determines whether any index exceed the threshold value.

The threshold value may have a preset value to determine whether or not there is a possibility of a problem with the value of the index. The threshold value may be a value preset in the information processing apparatus 20, or it may be a value set by the administrator or the participant. The threshold value setting may be determined by machine learning based on data of past meetings stored by the information processing system 1 and examples of past meetings that had the problem.

The machine learning refers to a technique for having a computer acquire human-like learning capabilities, whereby the computer autonomously generates algorithms necessary for decisions such as data identification from previously captured learning data, and applies them to new data to make predictions. The learning method for machine learning is not limited to supervised learning, but may be unsupervised learning, semi-supervised learning, reinforcement learning, or deep learning.

In a case that there are any indexes that exceed the threshold value, the data processing unit 905 moves the process to step S1602. On the other hand, in a case that there are no indexes that exceed the threshold value, the data processing unit 905 moves the process to step S1603.

In step S1602, the data processing unit 905 marks the index that exceed the threshold value. In this embodiment, marking automatically by the information processing apparatus 20 is referred to as "mark (automatic)," and automatically marked marker may be referred to as "marker (automatic)." The marking information of the marker (automatic) may also be referred to as "marking information (automatic)."

In step S1603, the data processing unit 905 stores the calculated index, the marking information (automatic), and the generated meeting audio in the memory unit 908.

By processes in FIG. 16, the information processing apparatus 20 can acquire and store the audio of the participant and other participants in the meeting, the information on the time when the marking operation is received, the index indicating the audio status of the participant and other participants, and the marking information (automatic).

(Process of Providing Display Screen)

Figure 17:
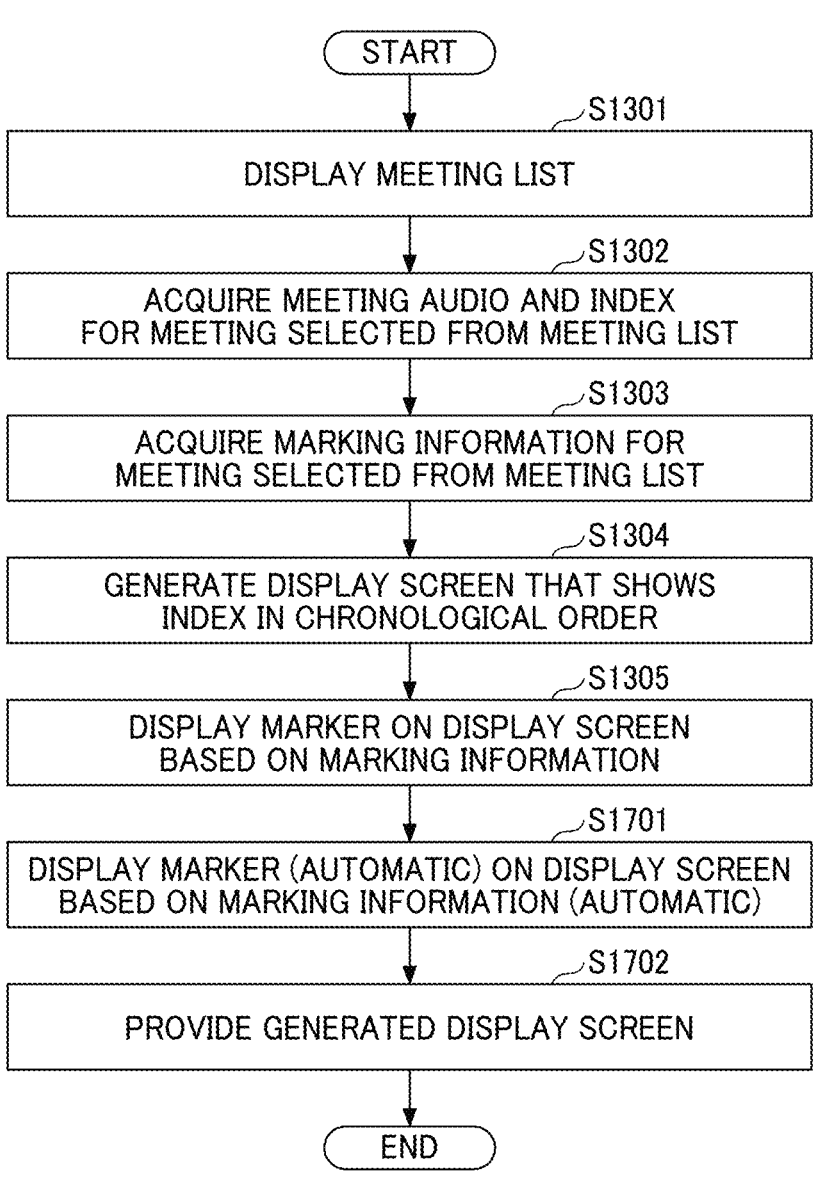
FIG. 17 is a flowchart illustrating an example of a display screen providing process according to the second exemplary embodiment.

FIG. 17 is a flowchart illustrating an example of a display screen providing process according to the second exemplary embodiment. This process shows another example of the display screen providing process in which the information processing apparatus 20 provides the display screen 400 as shown in FIG. 4, to the administrator terminal 101 or terminal 100.

The following explanation is based on the assumption that the information processing apparatus 20 provides the display screen 400 to the administrator terminal 101. However, other devices and methods for providing the display screen are also possible without departing from the scope of this disclosure.

Among the processes shown in FIG. 17, steps S1301 to S1305 are the same as the display screen providing process for the first exemplary embodiment described in FIG. 13.

In step S1701, the information providing unit 906 draws a marker (automatic) on the display screen based on the marking information (automatic) stored in step S1603 of FIG. 16. In step S1305, the information providing unit 906 draws markers 422A, 422B, and 422C on the volume timeline 420 as shown in FIG. 4, and then in step S1701, the information providing unit 906 draws markers 423A and 423B.

In step S1702, the information providing unit 906 provides the generated display screen to the administrator terminal 101.

By processes in FIG. 17, the information processing apparatus 20 can display the display screen 400 as shown in FIG. 4 to the administrator terminal 101.

Third Embodiment

In the third exemplary embodiment, an example of the process when the information processing apparatus 20 provides the display screen 600 as shown in FIG. 6 will be described.
(Process of Terminal)

Figure 18:
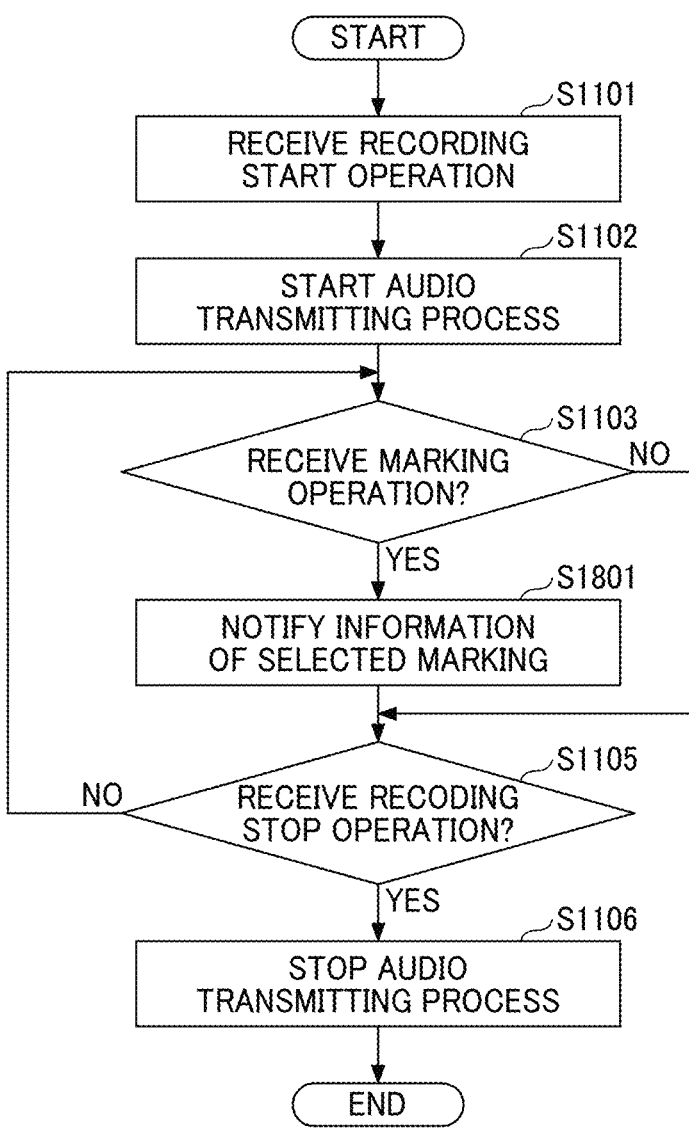
FIG. 18 is a flowchart illustrating an example of a process of the terminal according to a third exemplary embodiment.

FIG. 18 is a flowchart illustrating an example of a process of the terminal according to the third exemplary embodiment. Among the processes shown in FIG. 18, steps S1101 to S1103 and S1105 to S1106 are the same as the process of the terminal for the first exemplary embodiment described in FIG. 11.

In step S1103, in a case that the operation reception unit 915 receives the marking operation, and then in step S1801, the notification unit 916 notifies the information on the selected marking to the information processing apparatus 20 via the communication unit 911.

By processes in FIG. 18, the terminal 100 can notify information indicating that the "Marking A" button 331a is selected to the information processing apparatus 20 when the "Marking A" button 331A is selected on the operation screen 330 shown in FIG. 3C. Similarly, when the "Marking B" button 331b is selected on the operation screen 330, the terminal 100 can notify information indicating that the "Marking B" button 331B is selected to the information processing apparatus 20.
(Data Process)

Figure 19:
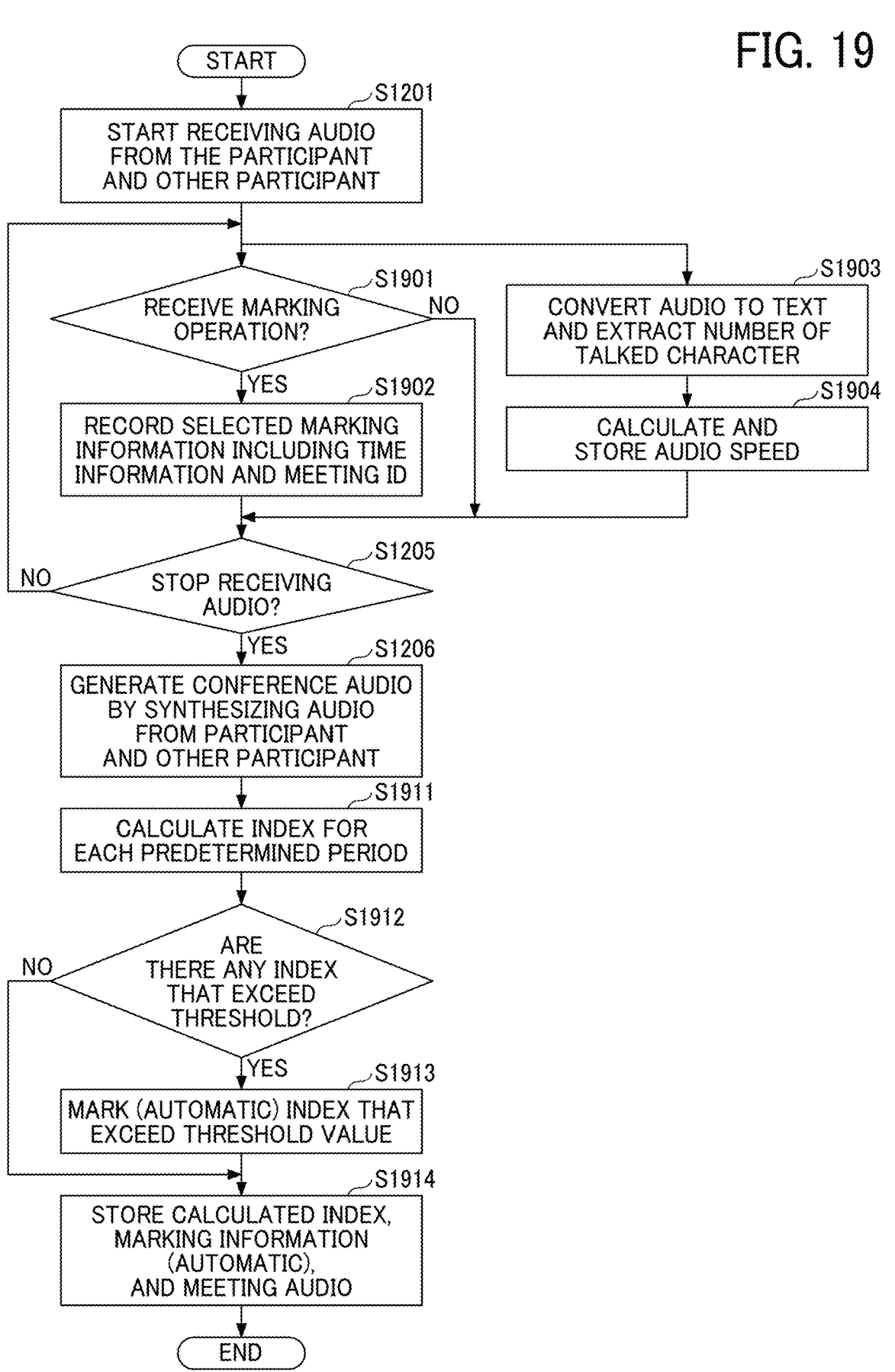
FIG. 19 is a flowchart illustrating an example of a data process according to the third exemplary embodiment.

FIG. 19 is a flowchart illustrating an example of a data process according to the third exemplary embodiment. Among the processes shown in FIG. 19, steps S1201 and S1205-S1206 are similar to the data process for the first exemplary embodiment described in FIG. 12.

In step S1901, the reception unit 903 determines whether the marking operation is received. For example, the reception unit 903 determines that the marking operation is received when the reception unit 903 receives information on the selected marking transmitted by the terminal 100. In case that the marking operation is received, the reception unit 903 moves the process to step S1902. On the other hand, in case that the marking operation is not received, the reception unit 903 moves the process to step S1205.

In step S1902, the recording unit 904 records marking information, which is information on selected marking, including time information indicating the time when the marking operation is received by the reception unit 903 and the meeting ID identifying the meeting in a DB.

In step S1903, the data processing unit 905 converts the audio of the participant and other participants acquired by the acquisition unit 902 into text for each utterance and extracts the number of audio characters in parallel with the processes of steps S1901 and S1902.

In step S1904, the data processing unit 905 calculates and stores the audio speed (the number of audio characters/audio time) from the extracted the number of audio characters and audio time. For example, the data processing unit 905 attaches the time stamp to the calculated audio speed and stores it in the storage unit 908.

After the reception of audio is stopped, in step S1911, the data processing unit 905 calculates the index for each predetermined period of time. For example, at each point in the meeting, the data processing unit 905 calculates the conversation density of the participant for each predetermined period by calculating the moving average for the predetermined period from the audio speed data. The conversation density is the index of the number of characters (or words) uttered within a given period of time. Similarly, at each point in the meeting, data processing unit 905 calculates the conversation density of other participants for each predetermined period by calculating the moving average for the predetermined period from the audio speed data of other participants.

In step S1912, the data processing unit 905 determines whether there are indexes that exceed the threshold value. In a case that there are indexes that exceed the threshold value, the data processing unit 905 moves the process to step S1913. On the other hand, in a case that there are no indexes that exceed the threshold value, the data processing unit 905 moves the process to step S1914.

In step S1913, the data processing unit 905 marks (automatically) the index that exceed the threshold value. The automatic marking by the information processing apparatus 20 may be referred to as "mark (automatic)" and the automatically marked marker may be referred to as "marker (automatic)" in this embodiment. The marking information of the marker (automatic) may also be referred to as "marking information (automatic)."

In step S1914, the data processing unit 905 stores the calculated index (conversation density), marking information (automatic), and generated meeting audio in the memory unit 908.

By processes in FIG. 19, the information processing apparatus 20 can acquire and store the audio of the participant and other participants in the meeting, the information on the time when the marking operation is received, the index indicating the audio status of the participant and other participants, and the marking information (automatic).
(Process for Providing Display Screens)

Figure 20:
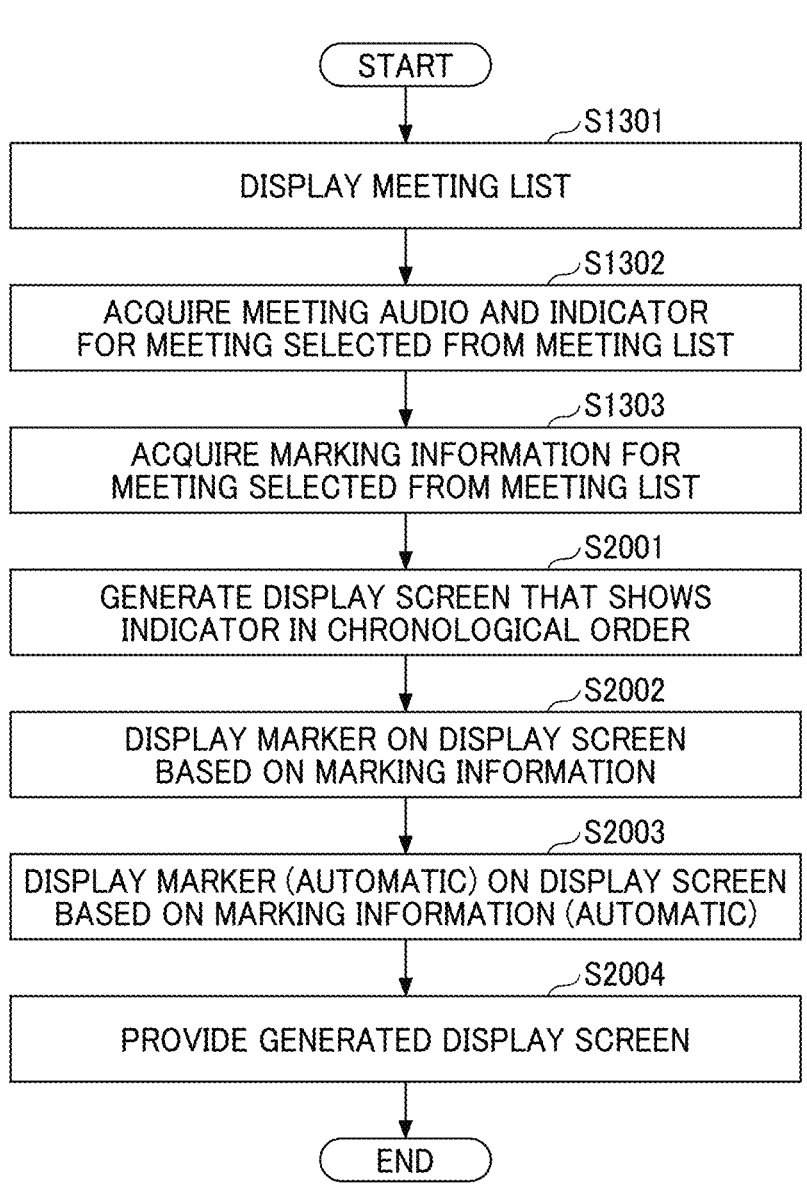
FIG. 20 is a flowchart illustrating an example of a display screen providing process according to the third exemplary embodiment.

FIG. 20 is a flowchart illustrating an example of a display screen providing process according to the third exemplary embodiment. This process shows an example of the display screen providing process in which the information process-ing apparatus 20 provides the display screen 600 as shown in FIG. 6 to the administrator terminal 101 or the terminal 100. The following explanation assumes that the information processing apparatus 20 provides the display screen 600 to the administrator terminal 101.

Among the processes shown in FIG. 20, steps S1301 to S1303 are the same as the process of providing the display screen for the first embodiment described in FIG. 13.

In step S2001, the information providing unit 906 generates the display screen that illustrates the index of the audio status of the participant and other participants based on the meeting audio in chronological order, which is the audio of the participant and other participants. For example, the information providing unit 906 generates the display screen 600 that illustrates the conversation density 610 as shown in FIG. 6. At this point, the markers 612A, 612B, 613, and 614A, 616B are not displayed in the conversation density 610.

In step S2002, the information providing unit 906 draws on the display screen the marker corresponding to the time when the marking operation is received, based on the time information included in the acquired marking information. For example, the information providing unit 906 draws markers 612A, 612B, and 613 on the conversation density 610 as shown in FIG. 6. At this point, markers 614A and 614B are not displayed in the conversation density 610.

In step S2003, the information providing unit 906 draws markers (automatic) on the display screen based on the marking information (automatic) stored in step S1914 of FIG. 19. For example, after drawing markers 612A, 612B, and 613 on the conversation density 610 as shown in FIG. 6 in step S2002, the information providing unit 906 draws markers 614A and 614B in step S2003.

In step S2004, the information providing unit 906 provides the generated display screen to the administrator terminal 101.

By the processes in FIG. 20, the information processing apparatus 20 can display to the administrator terminal 101 the display screen 600 as shown in FIG. 6.

(Marker Addition Process)

In the first through third embodiments is described assuming that the participant adds markers in real time during the meeting. However, the present disclosure is not limited to this. For example, the participant or administrator, can add one or more markers later on the display screen 400 as shown in FIG. 4.

Figure 21:
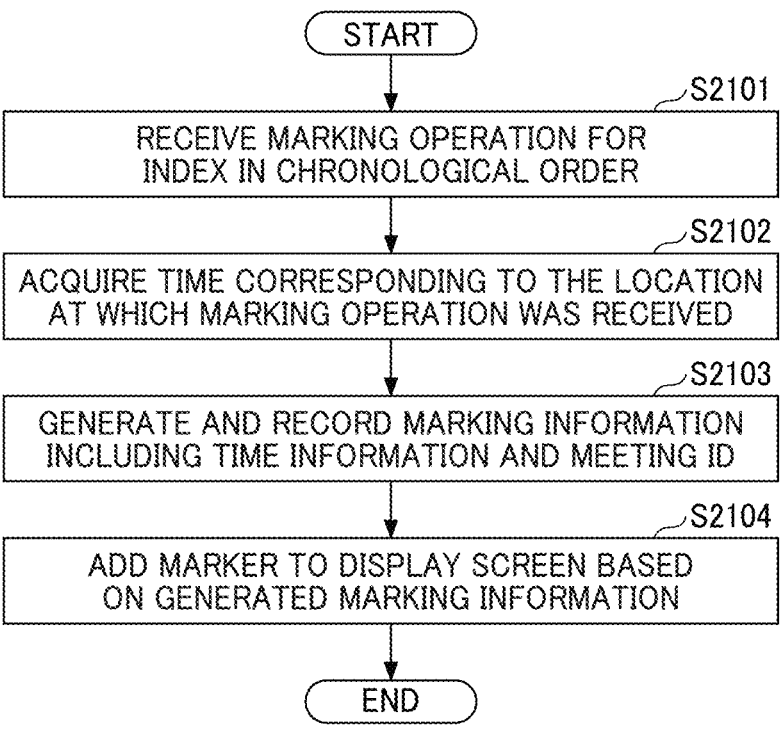
FIG. 21 is a flowchart illustrating an example of a marker addition process according to an exemplary embodiment.

FIG. 21 is a flowchart illustrating an example of a marker addition process according to an exemplary embodiment. At the start of the process shown in FIG. 21, it is assumed that the administrator terminal 101 is displaying the display screen 400 as shown in FIG. 4.

In step S2101, it is assumed that the administrator terminal 101 receives the marking operations for the index illustrated in chronological order. For example, the administrator can perform the marking operation by performing a predetermined operation (e.g., right-click, long-press, etc.) on the audio volume 421A of the participant or the audio volume 421B of other participant on the volume timeline 420 of the display screen 400 as shown in FIG. 4.

In step S2102, the recording unit 904 of the information processing apparatus 20 acquires the time corresponding to the location at which the marking operation is received.

In step S2103, the recording unit 904 generates the marking information including time information indicating the acquired time and the meeting ID, and records the information in the DB.

In step S2104, the information providing unit 906 of the information processing apparatus 20 adds a new marker to the volume timeline 420 of the display screen 400 based on the marking information generated by the recording unit 904. The added markers are displayed in the same manner as the markers 422A, 422B, and 422C given during the meeting and can also be used in the comment field.

The processes shown in FIG. 21 allows the information processing system 1 to add markers to the display screen not only during the meeting, but also after the meeting has ended.

According to each of the above exemplary embodiments, it is possible to provide the information processing system 1 that make it easy for participant in communication or an administrator to check the contents of communication after the communication has ended.

<Supplementation>

The functionality of the elements disclosed herein may be implemented using circuitry or processing circuitry which includes general purpose processors, special purpose processors, integrated circuits, ("Application Specific Integrated Circuits"), digital signal processors (DSPs), field programmable gate arrays (FPGAs), a CPU (a Central Processing Unit), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The group of devices described in the examples is only one of several computing environments for implementing the embodiments disclosed herein. In one embodiment, the meeting server 10 and the information processing apparatus 20 include a plurality of computing devices, such as a server cluster. The plurality of computing devices are configured to communicate with each other via any type of communication link, including networks, shared memory to perform the processing disclosed herein.

Furthermore, the information processing apparatus 20, the terminal 100, and the administrator terminal 101 can be configured to share the disclosed process steps shown in FIGS. 11-21, in various combinations. For example, the processes executed by the information processing apparatus 20 can be executed by the terminal 100 or the administrator terminal 101. The processes executed by the terminal 100 and the processes executed by the administrator terminal 101 can also be executed by the information processing apparatus 20. Furthermore, each element of the information processing apparatus 20 can be grouped into a single device or divided into multiple devices.

APPENDIX

The following information processing system, and information processing method are disclosed herein.

Aspects of the present disclosure are, for example, as follows.

According to a first aspect, the information processing system includes circuitry configured to acquire audio of participant and other participants in communication with each other, receive predetermined operation by the participant during the communication, record time information indicating the time when the predetermined operation is received, provide a display screen to display an index indicating an audio status of the participant and the other participant based on the audio, and a location where the predetermined operation is received during the communication based on the time information.

According to a second aspect, the information processing system of the first aspect, wherein the circuitry is further configured to provide the display screen to display the index based on the audio, and a marker corresponding to the time when the predetermined operation is received based on the time information.

According to a third aspect, the information processing system of the second aspect, wherein the circuitry is further configured to provide the display screen to display a comment field that receive input of a comment corresponding to the marker in a case that the marker is selected on the display screen.

According to a fourth aspect, the information processing system of the third aspect, wherein the comment field displays one or more comments input in the comment field.

According to a fifth aspect, the information processing system of the fourth aspect, wherein the comment field further displays information on a user who input the comment.

According to a sixth aspect, the information processing system of the third aspect, wherein the circuitry is further configured to provide the display screen to a terminal used by the participant or an administrator, wherein the comment field allows the participant or the administrator to enter the comment.

According to a seventh aspect, the information processing system of the first aspect, wherein the participant participates in the communication using a terminal, the terminal comprising second circuitry configured to transmit the audio of the participant and the other participants, display an operation screen to receive the predetermined operation by the participant on a display, notify that the operation screen has received the predetermined operation.

According to an eighth aspect, the information processing system of the seventh aspect, wherein the operation screen includes a plurality of display elements that each receive different marking operations, wherein the circuitry is further configured to provide the display screen to display the marker based on a display element selected by the participant.

According to a nineth aspect, the information processing system of the second aspect, wherein the circuitry is further configured to provide the display screen displaying a first audio volume of the participant and a second audio volume of the other participants in chronological order, and displaying another marker different from the marker at a location where the first audio volume or the second audio volume exceed first threshold.

According to a tenth aspect, the information processing system of the second aspect, wherein the circuitry is further configured to provide the display screen to display a first conversation density of the participant and a second conversation density of the other participants in chronological order, and display another marker different from the marker at a location where the first conversation density or the second conversation density exceed a second threshold.

According to an eleventh aspect, the information processing system of the nineth aspect, wherein the circuitry is further configured to provide the display screen to display a comment field corresponding to the other marker in case that the other marker is selected on the display screen.

According to a twelfth aspect, the information processing system of the first aspect, wherein the circuitry is further configured to replay the audio at a location selected from the index indicating the audio status displayed on the display screen.

According to a thirteenth aspect, the information processing system of the first aspect, wherein the circuitry is further configured to provide the display screen to display a character string that convert the audio at a location selected from the index indicating the speech status displayed on the display screen.

According to a first aspect, an information processing method comprise acquiring audio of participant and other participants in communication with each other, receiving predetermined operation by the participant during the communication, recording time information indicating the time when the predetermined operation is received, providing a display screen to display an index indicating an audio status of the participant and the other participant based on the audio, and a location where the predetermined operation is received during the communication based on the time information.

According to a first aspect, a non-transitory computer readable medium storing computer executable instructions which, when executed by circuitry of an information processing system, cause the information processing system to perform a process comprising acquiring audio of participant and other participants in communication with each other, receiving predetermined operation by the participant during the communication, recording time information indicating the time when the predetermined operation is received, providing a display screen to display an index indicating audio status of the participant and the other participant based on the audio, and location where the predetermined operation is received during the communication based on the time information.

The invention claimed is:

1. An information processing system comprising:
   circuitry configured to:
   acquire audio of a participant and other participants in communication with each other;
   receive predetermined operation by the participant during the communication;
   record time information indicating a time when the predetermined operation is received; and
   provide a display screen to display an index indicating an audio status of the participant and the other participants based on the audio, and a location where the predetermined operation is received during the communication based on the time information,
   wherein the circuitry is further configured to:
   provide the display screen to display the index based on the audio, and a marker corresponding to the time when the predetermined operation is received based on the time information, and
   provide the display screen to display a first audio volume of the participant and a second audio volume of the other participants in chronological order, and display another marker different from the marker at a location where the first audio volume or the second audio volume exceeds a first threshold.

2. The information processing system of claim 1, wherein the circuitry is further configured to:
   provide the display screen to display a comment field that receive input of a comment corresponding to the marker in a case that the marker is selected on the display screen.

3. The information processing system of claim 2, wherein the comment field displays one or more comments input in the comment field.

4. The information processing system of claim 3, wherein the comment field further displays information on a user who input the comment.

5. The information processing system of claim 2, wherein the circuitry is further configured to:

provide the display screen to a terminal used by the participant or an administrator;

wherein the comment field allows the participant or the administrator to enter the comment.

6. The information processing system of claim 1, wherein the participant participates in the communication using a terminal;

the terminal comprising second circuitry configured to:

transmit the audio of the participant and the other participants;

display an operation screen to receive the predetermined operation by the participant on a display; and in response to receipt of the predetermined operation, notify that the operation screen has received the predetermined operation.

7. The information processing system of claim 6, wherein the predetermined operation includes at least one starting recording of the communication and stopping recording of the communication.

8. The information processing system of claim 6, wherein the operation screen includes a plurality of display elements that each receive different marking operations;

wherein the circuitry is further configured to:

provide the display screen to display the marker based on a display element selected by the participant.

9. The information processing system of claim 1, wherein the first threshold is determined by applying machine learning to past communications.

10. The information processing system of claim 9, wherein the machine learning includes at least one of supervised learning, unsupervised learning, semi-supervised learning, and deep learning.

11. The information processing system of claim 1, wherein the circuitry is further configured to:

provide the display screen to display a first conversation density of the participant and a second conversation density of the other participants in chronological order, and display another marker different from the marker at a location where the first conversation density or the second conversation density exceeds a second threshold.

12. The information processing system of claim 11, wherein the second threshold is determined by applying machine learning to past communications.

13. The information processing system of claim 12, wherein the machine learning includes at least one of supervised learning, unsupervised learning, semi-supervised learning, and deep learning.

14. The information processing system of claim 1, wherein the circuitry is further configured to:

provide the display screen to display a comment field corresponding to the other marker in a case that the other marker is selected on the display screen.

15. The information processing system of claim 1, wherein the circuitry is further configured to:

replay the audio at a location selected from the index indicating the audio status displayed on the display screen.

16. The information processing system of claim 1, wherein the circuitry is further configured to:

provide the display screen to display a character string converted from the audio at a location selected from the index indicating the speech status displayed on the display screen.

17. An information processing method, comprising:

acquiring audio of a participant and other participants in communication with each other;

receiving predetermined operation by the participant during the communication;

recording time information indicating a time when the predetermined operation is received; and providing a display screen to display an index indicating audio status of the participant and the other participants based on the audio, and a location where the predetermined operation is received in the communication based on the time information, wherein the method further includes:

providing the display screen to display the index based on the audio, and a marker corresponding to the time when the predetermined operation is received based on the time information, and providing the display screen to display a first audio volume of the participant and a second audio volume of the other participants in chronological order, and display another marker different from the marker at a location where the first audio volume or the second audio volume exceeds a first threshold.

18. A non-transitory computer readable medium storing computer executable instructions which, when executed by circuitry of an information processing system, cause the information processing system to perform a process comprising:

acquiring audio of a participant and other participants in communication with each other;

receiving predetermined operation by the participant during the communication;

recording time information indicating a time when the predetermined operation is received; and providing a display screen to display an index indicating audio status of the participant and the other participants based on the audio, and a location where the predetermined operation is received in the communication based on the time information, wherein the process further includes:

providing the display screen to display the index based on the audio, and a marker corresponding to the time when the predetermined operation is received based on the time information, and providing the display screen to display a first audio volume of the participant and a second audio volume of the other participants in chronological order, and display another marker different from the marker at a location where the first audio volume or the second audio volume exceeds a first threshold.

* * * * *